(12) United States Patent
Park et al.

(10) Patent No.: US 6,349,284 B1
(45) Date of Patent: *Feb. 19, 2002

(54) SCALABLE AUDIO ENCODING/DECODING METHOD AND APPARATUS

(75) Inventors: Sung-hee Park, Seoul; Yeon-bae Kim, Suwon, both of (KR)

(73) Assignee: Samsung SDI Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/084,893

(22) Filed: May 28, 1998

(30) Foreign Application Priority Data

Nov. 20, 1997 (KR) .......................................... 97-61606

(51) Int. Cl.[7] ............................................. G10L 19/00
(52) U.S. Cl. ...................................... 704/500; 704/230
(58) Field of Search ............................... 704/500, 230, 704/229

(56) References Cited

U.S. PATENT DOCUMENTS

| | | | |
|---|---|---|---|
| 4,191,858 A | 3/1980 | Areseki | 704/224 |
| 4,912,763 A | 3/1990 | Galand et al. | 704/230 |
| 5,649,053 A | 7/1997 | Kim | |
| 5,924,064 A | 7/1999 | Helf | 704/229 |
| 6,122,618 A | * 9/2000 | Park | 704/500 |

OTHER PUBLICATIONS

Cox, R.V. "Subband speech coding and matched convolution channel coding for mobile radio channels" IEEE, 1991.*

Cox et al "New directions in subband coding" 2/88, IEEE, pp. 391–409.

Tan et al "Real time software implementation of scalable video codec" 1996, IEEE, pp. 17–20.

(List continued on next page.)

*Primary Examiner*—Richemond Dorvil
*Assistant Examiner*—Susan McFadden
(74) *Attorney, Agent, or Firm*—Burns, Doane, Swecker & Mathis, L.L.P.

(57) ABSTRACT

A scalable audio encoding/decoding method and apparatus are provided. To code an audio signal into layered data streams having a base layer and at least one enhancement layer, the encoding method includes the steps of time/frequency mapping input audio signals and quantizing the spectral data with the same scale factor for each predetermined scalefactor band, and packing the quantized data into bit streams, wherein the bit stream generating step comprises the steps of coding the quantized data corresponding to the base layer, coding the quantized data corresponding to the next enhancement layer of the coded base layer and the remaining quantized data uncoded by a limit in a layer size and belonging to the coded layer, and performing the layer coding step for all enhancement layers to form bit streams. In the base layer coding step, the enhancement layer coding step and the sequential coding step, arithmetic coding is performed using a predetermined probability model in the order of bit sequences from the most significant bit sequence to the least significant bit sequence by representing the side information and quantized data corresponding to a layer to be coded in a predetermined number of bits. The side information contains scale factors and probability model information to be used in arithmetic coding.

52 Claims, 3 Drawing Sheets

OTHER PUBLICATIONS

Bertram et al "Scalability of audio quality for networked multimedia" 6/97, IEEE, pp. 294–301.

Tang et al "A perceptually based embedede sibband speech coder" 3/97, IEEE, pp. 131–140.

Cox et al "Subband speech coding and matched convolutional channel coding for mobile radio channels" 8/91, IEEE, pp. 1717–1731.

MPEG–4 Audio Standard, //ISO/JTC 1/SC 29 WG11 N2577GA, Date: Dec. 11, 1998, WD 14496–3 Amd 1 Subpart 3.

Tang et al., "A Perceptually based Embedded Subband Speech Coder," IEEE Transactions on Speech and Audio Processing, Vo. 5, Issue 2, Mar. 1997, pp. 131–140).

Mark Nelson, "Arithmetic Coding+Statistical Modeling= Data Compression, Part I—Arithmetic Coding," *Dr. Dobb's Journal*, Feb. 1991.

U.S. patent application No. 09/106,016 filed Jun. 29, 1998, entitled "Scalable Stereo Encoding/Decoding Method and Apparatus".

U.S. patent application No. 08/978,877 filed Nov. 26, 1997, entitled "Digital Data Coding/Decoding Method and Apparatus".

U.S. patent application No. 08/978,881 filed Nov. 26, 1997, entitled "Digital Data Coding/Decoding Method and Apparatus".

U.S. patent application No. 08/979,175 filed Nov. 26, 1997, entitled "Scalable Audio Coding/Decoding Method and Apparatus".

U.S. patent application No. 09/053,660 filed Apr. 2, 1998, entitled "Scalable Audio Coding/Decoding Method and Apparatus".

U.S. patent application No. 09/053,661 filed Apr. 2, 1998, entitled "Digital Data Coding/Decoding Method and Apparatus".

U.S. patent application No. 09/053,664 filed Apr. 2, 1998, entitled "Scalable Audio Coding/Decoding Method and Apparatus Without Overlap of Information Between Various Layers".

* cited by examiner-

SCALABLE AUDIO ENCODING/DECODING METHOD AND APPARATUS

Priority to U.S. application Ser. No. 08/978,877, now U.S. Pat. No. 6,122,618, is claimed under 35 U.S.C. §120.

BACKGROUND OF THE INVENTION

1. Field of the Invention

The present invention relates to audio encoding and decoding, and more particularly, to a scalable audio encoding/decoding method and apparatus using bit-sliced arithmetic coding. The present invention is adopted as ISO/IEC JTC1/SC29/WG11 N1903 (ISO/IEC Committee Draft 14496-3 SUBPART 4).

2. Description of the Related Art

The MPEG audio standards or AC-2/AC-3 method provide almost the same audio quality as a compact disc, with a bitrate of 64~384 Kbps which is one-sixth to one-eighth that of conventional digital coding. For this reason, MPEG audio standards play an important role in storing and transmitting audio signals as in digital audio broadcasting (DAB), internet phone, or audio on demand (AOD).

Research into methods by which clear audio quality in its original sound can be reproduced at a lower bitrate have been ongoing. One method is an MPEG-2 Advanced Audio Coding (AAC) authorized as a new international standard. The MPEG-2 AAC providing the clear audio quality to the original sound at 64 kbps has been recommended by the experts group.

In conventional techniques, a fixed bitrate is given in an encoder, and the optimal state suitable for the given bitrate is searched to then perform quantization and coding, thereby exhibiting considerably better efficiency. However, with the advent of multimedia technology, there is an increasing demand for a coder/decoder (codec) having versatility at a low bitrate. One such demand is a scalable audio codec. The scalable audio codec can make bitstreams coded at a high bitrate into low bitrate bitstreams to then restore only some of them. By doing so, signals can be restored with a reasonable efficiency, with only some of the bitstreams, exhibiting little deterioration in performance due to lowered bitrates, when an overload is applied to the system or the performance of a decoder is poor, or by a user's request.

According to general audio coding techniques such as the MPEG-2 AAC standards, a fixed bitrate is given to a coding apparatus, the optimal state for the given bitrate is searched to then perform quantization and coding, thereby forming bitstreams in accordance with the bitrate. One bitstream contains information for one bitrate. In other words, bitrate information is contained in the header of a bitstream and a fixed bitrate is used. Thus, a method exhibiting the best efficiency at a specific bitrate can be used. For example, when a bitstream is formed by an encoder at a bitrate of 64 Kbps, the best quality sound can be restored by a decoder corresponding to an encoder having a bitrate of 64 Kbps.

According to such methods, bitstreams are formed without consideration of other bitrates, but bitstreams having a magnitude suitable for a given bitrate, rather than the order of the bitstreams, are formed. Actually, if the thus-formed bitstreams are transmitted via a communications network, the bitstreams are sliced into several slots to then be transmitted. When an overload is applied to a transmission channel, or only some of the slots sent from a transmission end are received at a reception end due to a narrow bandwidth of the transmission channel, data cannot be reconstructed properly. Also, since bitstreams are not formed according to the significance thereof, if only some of the bitstreams are restored, the quality is severely degraded. The reconstructed audio data makes sound objectionable to the ear.

In the case of a scalable audio codec for solving the above-described problems, coding for a base layer is performed and then a difference signal between the original signal and the coded signal is coded in the next enhancement layer (K. Brandenburg. Et al., "First Ideas on Scalable Audio Coding", 97th AES-Conventional, preprint 3924, San Francisco, 1994) and (K. Brandenburg, et al., "A Two- or Three-Stage Bit Rate Scalable Audio Coding System", 99th AES-Convention, preprint 4132, New York, 1995). Thus, the more layers there are the poorer the performance at a high bitrate. In the case of using a scalable coding apparatus, a signal having good audio quality is reproduced initially. However, if the state of communication channels is worsened or the load applied to the decoder of a receiving terminal is increased, a sound having a low bitrate quality is reproduced. Therefore, the aforementioned encoding method is not suitable for practically attaining scalability.

SUMMARY OF THE INVENTION

To solve the above problems, it is an objective of the present invention to provide a scalable digital audio data encoding method, apparatus, and recording medium for recording the encoding method, using a bit-sliced arithmetic coding (BSAC) technique, instead of a lossless coding module, with all other modules of the conventional coder remaining unchanged.

It is another objective of the present invention to provide a scalable digital audio data decoding method, apparatus, and recording medium for recording the decoding method, using a bit-sliced arithmetic coding (BSAC) technique, instead of a lossless coding module, with all other modules of the conventional audio decoder remaining unchanged.

To achieve the first objective of the present invention, there is provided a scalable audio encoding method for coding audio signals into a layered datastream having a base layer and enhancement layers of a predetermined number, comprising the steps of: signal-processing input audio signals and quantizing the same for each predetermined coding band; and packing the quantized data to generate bitstreams, wherein the bitstream generating step comprises: coding the quantized data corresponding to the base layer; coding the quantized data corresponding to the next enhancement layer of the coded base layer and the remaining quantized data uncoded due to a layer size limit and belonging to the coded layer; and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number; and then arithmetic-coded using a predetermined probability model in the order ranging from the MSB sequences to the LSB sequences, the side information containing scale factors and probability models to be used in the arithmetic coding.

The step of coding the scale factors comprises the steps of: obtaining the maximum scale factor; and obtaining differences between the maximum scale factor and the respective scale factors and arithmetic-coding the differences.

When the quantized data is composed of sign data and magnitude data, the coding step comprises the steps of:

coding by a predetermined encoding method the most significant bit sequences composed of most significant bits of the magnitude data of the quantized data represented by the same number of bits; coding sign data corresponding to non-zero data among the coded most significant bit sequences; coding the most significant bit sequences among uncoded magnitude data of the digital data by a predetermined encoding method; coding uncoded sign data among the sign data corresponding to non-zero magnitude data among bit sequences; and performing the magnitude data coding step and the sign data coding step on the respective bits of the digital data.

The coding steps are performed by coupling bits composing the respective bit sequences for the magnitude data and sign data, into units of bits of a predetermined number.

A four-dimensional vector coupled in units of bits is divided into two subvectors according to its pre-states in coding the respective samples.

The bitrate of the base layer is 16 kbps and the interlayer bitrate is 8 kbps.

To achieve the second objective of the present invention, there is provided a scalable audio coding apparatus comprising: a quantizing portion for signal-processing input audio signals and quantizing the same for each coding band; and a bit packing portion for generating bitstreams by band-limiting for a base layer so as to be scalable, coding side information corresponding to the base layer, coding the quantized information sequentially from the most significant bit sequence to the least significant bit sequence, and from lower frequency components to higher frequency components, and coding side information corresponding to the next enhancement layer of the base layer and the quantized data, to perform coding on all layers.

The quantizing portion comprises: a time/frequency mapping portion for converting the input audio signals of a temporal domain into signals of a frequency domain; a psychoacoustic portion for coupling the converted signals by signals of predetermined subbands by time/frequency mapping and calculating a masking threshold at each subband using a masking phenomenon generated by interaction of the respective signals; and a quantizing portion for quantizing the signals for each predetermined coding band while the quantization noise of each band is compared with the masking threshold.

To achieve the third objective of the present invention, there is provided a scalable audio decoding method for decoding audio data coded to have layered bitrates, comprising the steps of: decoding side information having at least scale factors and arithmetic-coding model information allotted to each band, in the order of creation of the layers in datastreams having layered bitrates, by analyzing the significance of bits composing the datastreams, from upper significant bits to lower significant bits, using the arithmetic coding models corresponding to the quantized data; restoring the decoded scale factors and quantized data into signals having the original magnitudes; and converting inversely quantized signals into signals of a temporal domain.

The decoding of the scale factors are performed by the steps of: decoding the maximum scale factor in the bitstream, arithmetic-decoding differences between the maximum scale factor and the respective scale factors, and subtracting the differences from the maximum scale factor.

Also, there is provided a scalable audio decoding apparatus comprising: a bitstream analyzing portion for decoding side information having at least scale factors and arithmetic model information and quantized data, in the order of creation of the layers in layered bitstreams; an inverse quantizing portion for restoring the decoded scale factors and quantized data into signals having the original magnitudes; and a frequency/time mapping portion for converting inversely quantized signals of a frequency domain into signals of a temporal domain.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). For instance, there is provided a computer usable medium, tangibly embodying a program of instructions executable by the machine to perform a scalable audio coding method for coding audio signals into a layered datastream having a base layer and enhancement layers of a predetermined number, the method comprising the steps of: signal-processing input audio signals and quantizing the same for each predetermined coding band; and packing the quantized data to generate bitstreams, wherein the bitstream generating step comprises: coding the quantized data corresponding to the base layer; coding the quantized data corresponding to the next enhancement layer of the coded base layer and the remaining quantized data uncoded due to a layer size limit and belonging to the coded layer; and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a predetermined same number; and then arithmetic-coded using a predetermined probability model in the order ranging from the MSB sequences to the LSB sequences, the side information containing scale factors and probability models to be used in the arithmetic coding.

The scale factor coding step comprises the steps of: obtaining the maximum scale factor; and obtaining differences between the maximum scale factor and the respective scale factors and arithmetic-coding the same.

The coding of the information for the probability models is performed by the steps of: obtaining the minimum value of the probability model information values; obtaining differences the minimum probability model information and the respective model information values and arithmetic-coding the same using the probability models listed in Tables 5.5 through 5.9.

Also, there is provided a computer usable medium, tangibly embodying a program of instructions executable by the machine to perform a scalable audio decoding method for decoding audio data coded to have layered bitrates, comprising the steps of: decoding side information having at least scale factors and arithmetic-coding model information allotted to each band, in the order of creation of the layers in datastreams having layered bitrates, by analyzing the significance of bits composing the datastreams, from upper significant bits to lower significant bits, using the arithmetic coding models corresponding to the quantized data; restoring the decoded scale factors and quantized data into signals having the original magnitudes; and converting inversely quantized signals into signals of a temporal domain, a recording medium capable of reading a program for executing the scalable audio encoding method using a computer.

The bitstreams are decoded in units of four-dimensional vectors, and bit-sliced information of four samples in the four-dimensional vectors is decoded.

The decoding of the scale factors is performed by decoding the maximum scale factor, arithmetic-coding the differences between the maximum scale factor and the respective scale factors and subtracting the differences from the maximum scale factor.

The decoding of the arithmetic model indices is performed by decoding the minimum arithmetic model index in the bitstream, decoding differences between the minimum index and the respective indices in the side information of the respective layers, and adding the minimum index and the differences.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Hereinbelow, preferred embodiments of the present invention will be described in detail with reference to accompanying drawings.

Bitstreams formed in the present invention are not constituted by a single bitrate but are constituted by several enhancement layers based on a base layer. The present invention has good coding efficiency, that is, the best performance is exhibited at a fixed bitrate as in the conventional coding techniques, and relates to a coding/decoding method and apparatus in which the bitrate coded suitable for the advent of multimedia technology is restored.

Figure 1:
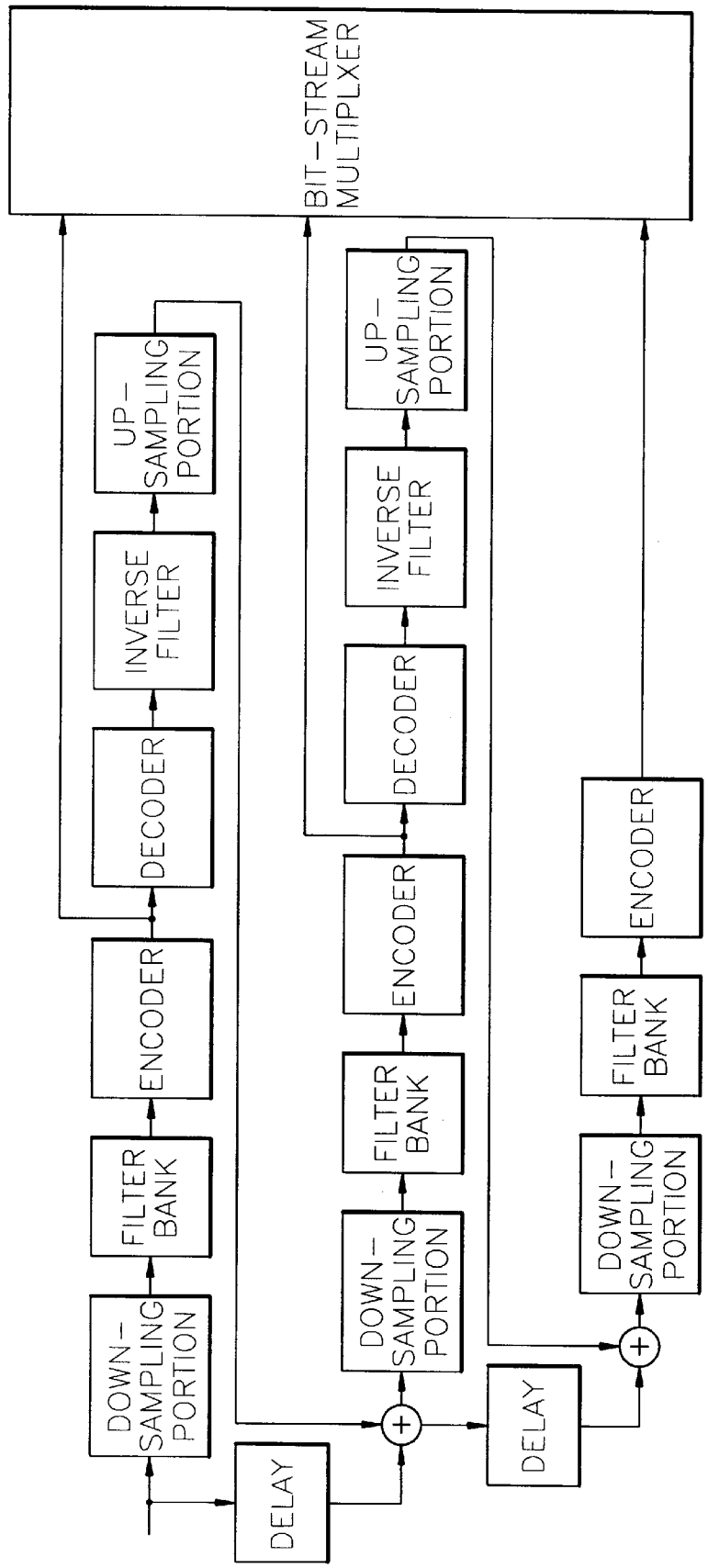
FIG. 1 is a block diagram of a simple scalable coding/decoding apparatus (codec)
Figure 2:
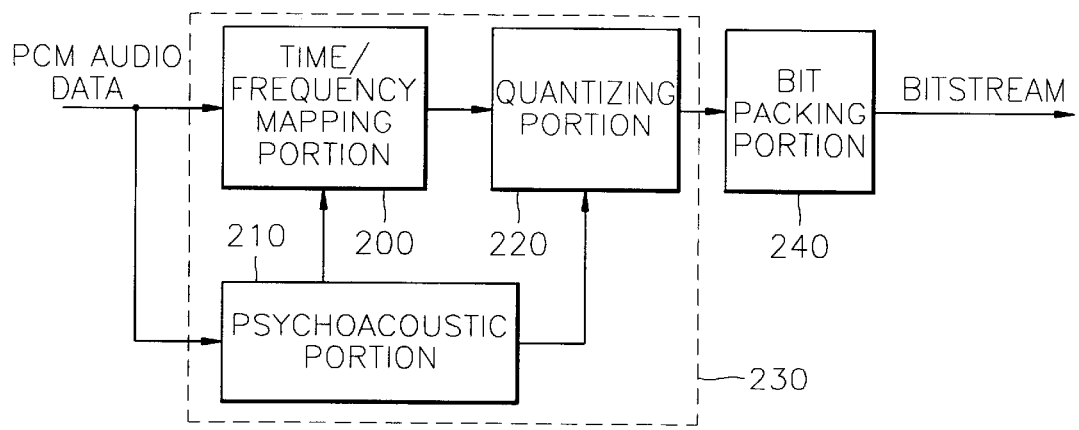
FIG. 2 is a block diagram of a coding apparatus according to the present invention.

FIG. 2 is a block diagram of a scalable audio encoding apparatus according to the present invention, which largely includes a quantization processor 230 and a bit packing portion 240.

The quantization processor 230 for signal-processing input audio signals and quantizing the same for predetermined coding band, includes a time/frequency mapping portion 200, a psychoacoustic portion 210 and a quantizing portion 220. The time/frequency mapping portion 200 converts the input audio signals of a temporal domain into signals of a frequency domain. A perceived difference between signal characteristics by the human ear is not very large temporally. However, according to human psychoacoustic models, a big difference is produced for each band. Thus, compression efficiency can be enhanced by allotting different quantization bits depending on frequency bands.

The psychoacoustic portion 210 couples the converted signals by signals of predetermined subbands by the time/frequency mapping portion 200 and calculates a masking threshold at each subband using a masking phenomenon generated by interaction with the respective signals. The masking phenomenon is a phenomenon in which an audio signal (sound) is inaudible due to another signal. For example, when a train passes through a train station, a person cannot hear his/her counter part's voice during a low-voice conversation due to the noise caused by the train.

The quantizing portion 220 quantizes the signals for each predetermined coding band so that the quantization noise of each band becomes smaller than the masking threshold. In other words, the frequency signals of each band are applied to scalar quantization so that the magnitude of the quantization noise of each band is smaller than the masking threshold, so as to be imperceivable. Quantization is performed so that the NMR (Noise-to-Mask Ratio) value, which is a ratio of the masking threshold calculated by the psychoacoustic portion 210 to the noise generated at each band, is less than or equal to 0 dB. The NMR value less than or equal to 0 dB means that the masking threshold is higher than the quantization noise. In other words, the quantization noise is not audible.

The bit packing portion 240 codes side information and the quantized data corresponding to a base layer having the lowest bitrate, successively codes side information and the quantized data corresponding to the next enhancement layer of the base layer, and performs this procedure for all layers, to generate bitstreams. Here, the side information includes scale factors and probability model information to be used in arithmetic coding. Coding the quantized data of the respective layers is performed by the steps of slicing each quantized data into units of bits by representing the quantized data as binary data comprised of bits of a predetermined same number, and coding the bit-sliced data sequentially from the most significant bit sequence to the least significant bit sequence, using a predetermined probability model. When the digital data is composed of sign data and magnitude data, the bit packing portion 240 collects each magnitude data for the bits having the same significance level among the bit-sliced data, codes the magnitude data, and then codes the uncoded sign data among the sign data corresponding to non-zero magnitude data among the coded magnitude data. Here, the coding procedure for the sign data and the magnitude data are performed sequentially from the MSBs to the lower significant bits.

Figure 3:
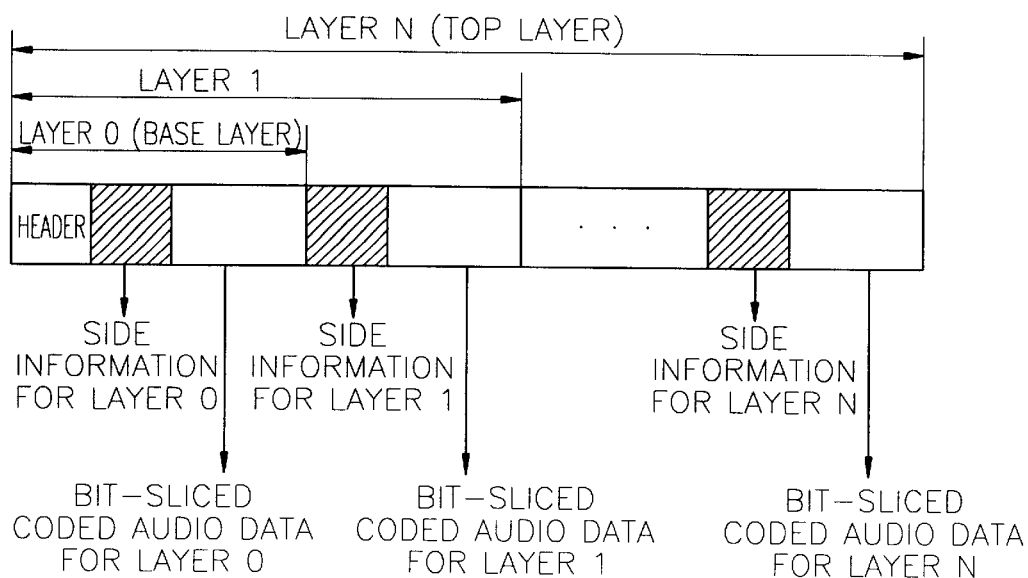
FIG. 3 shows the structure of a bitstream according to the present invention.

The bitstreams formed by the coding apparatus having the aforementioned configuration have a layered structure in which the bitstreams of lower bitrate layers are contained in those of higher bitrate layers, as shown in FIG. 3. Conventionally, side information is coded first and then the remaining information is coded to form bitstreams. However, in the present invention, as shown in FIG. 3, the side information for each enhancement layer is separately coded. Also, although all quantized data are sequentially coded in units of samples conventionally, in the present invention, quantized data is represented by binary data and is coded from the MSB sequence of the binary data to form bitstreams within the allocated bits.

Now, the operation of the coding apparatus will be described. Input audio signals are coded and generated as bitstreams. To this end, the input signals are converted to signals of a frequency domain through MDCT (Modified Discrete Cosine Transform) in the time/frequency mapping portion 200. The psychoacoustic portion 210 couples the frequency signals by appropriate subbands to obtain a masking threshold.

The quantizing portion 220 performs scalar quantization so that the magnitude of the quantization noise of each scale factor band is smaller than the masking threshold, which is audible but is not perceivable within allocated bits. If quantization fulfilling such conditions is performed, scale factors for the respective scale factor bands and quantized frequency values are generated.

Generally, in view of human psychoacoustics, close frequency components can be easily perceived at a lower frequency. However, as the frequency increases, the interval of perceivable frequencies becomes wider. The bandwidths of the scale factor bands increase as the frequency bands become higher. However, to facilitate coding, the scale factor bands of which the bandwidth is not constant are not used for coding, but coding bands of which the bandwidth is constant are used instead. The coding bands include 32 quantized frequency coefficient values.

1. Coding of Scalefactors

To compress scalefactors, an arithmetic coding method is used. To this end, first, the maximum scalefactor (max_scalefactor) is obtained. Then, differences between the respective scalefactors and the maximum scalefactor are obtained and then the differences are arithmetic-coded. Four models are used in arithmetic-coding the differences between scale factors. The four models are demonstrated in Tables 5.1 through 5.4. The information for the models is stored in a scalefactor_model.

[TABLE 5.1]

Differential scale factor arithmetic model 1

| Size | Cumulative frequencies |
|---|---|
| 8 | 1342, 790, 510, 344, 214, 127, 57, 0 |

TABLE 5.2

Differential scale factor arithmetic model 2

| Size | Cumulative frequencies |
|---|---|
| 16 | 2441, 2094, 1798, 1563, 1347, 1154, 956, 818, 634, 464, 342, 241, 157, 97, 55, 0 |

TABLE 5.3

Differential scale factor arithmetic model 3

| Size | Cumulative frequencies |
|---|---|
| 32 | 3963, 3525, 3188, 2949, 2705, 2502, 2286, 2085, 1868, 1668, 1515, 1354, 1207, 1055, 930, 821, 651, 510, 373, 269, 192, 134, 90, 58, 37, 29, 24, 15, 10, 8, 5, 0 |

TABLE 5.4

Differential scale factor arithmetic model 4

| Size | Cumulative frequencies |
|---|---|
| 64 | 13587, 13282, 12961, 12656, 12165, 11721, 11250, 10582, 10042, 9587, 8742, 8010, 7256, 6619, 6042, 5480, 4898, 4331, 3817, 3374, 3058, 2759, 2545, 2363, 2192, 1989, 1812, 1582, 1390, 1165, 1037, 935, 668, 518, 438, 358, 245, 197, 181, 149, 144, 128, 122, 117, 112, 106, 101, 85, 80, 74, 69, 64, 58, 53, 48, 42, 37, 32, 26, 21, 16, 10, 5, 0 |

2. Coding of Arithmetic-coding Model Index

Each coding band includes 32 frequency components. The 32 quantized frequency coefficients are arithmetic-coded. Then, a model to be used for arithmetic coding for each coding band is decided, and the information is stored in the arithmetic coding model index (ArModel). To compress the ArModel, an arithmetic coding method is used. To this end, first, the minimum ArModel index min_ArModel) is obtained. Then, differences between the respective ArModel indices and the minimum ArModel index are obtained and then the differences are arithmetic-coded. Here, four models are used in arithmetic-coding the differences. The four models are demonstrated in Tables 5.5 through 5.8. The information for the model used in the arithmetic coding is stored in an ArModel_model.

[TABLE 5.5]

Differential ArModel arithmetic model 1

| Size | Cumulative frequencies |
|---|---|
| 4 | 9868, 3351, 1676, 0 |

TABLE 5.6

Differential ArModel arithmetic model 2

| Size | Cumulative frequencies |
|---|---|
| 8 | 12492, 8600, 5941, 3282, 2155, 1028, 514, 0 |

TABLE 5.7

Differential ArModel arithmetic model 3

| Size | Cumulative frequencies |
|---|---|
| 16 | 14316, 12248, 9882, 7516, 6399, 5282, 4183, 3083, 2247, 1411, 860, 309, 185, 61, 31, 0 |

TABLE 5.8

Differential ArModel arithmetic model 4

| Size | Cumulative frequencies |
|---|---|
| 40 | 12170, 7956, 6429, 4901, 4094, 3287, 2982, 2677, 2454, 2230, 2062, 1894, 1521, 1348, 1199, 1050, 854, 658, 468, 278, 169, 59, 38, 18, 17, 14, 13, 12, 11, 10, 9, 8, 7, 6, 5, 4, 3, 2, 1, 0 |

1.3 Bit-sliced Coding of Quantized Frequency Components

Generally, the significance of the MSB (most significant bit) is far greater than that of the LSB (least significant bit). However, according to the conventional method, coding is performed irrespective of significance. Thus, if only some bitstreams from the leading bitstreams among all bitstreams are to be used, the information less important than the information included in the unused lagging bitstreams is considerably included in the leading bitstreams.

By the foregoing reason, in the present invention, quantized signals of the respective bands are coded sequentially from the MSBs to the LSBs. In other words, the respective quantized signals are represented by binary notation, and the quantized values of the respective frequency components are sequentially processed in units of bits, from low frequency components to high frequency components. First, the MSBs of the respective frequency components are obtained, and then the next upper significant bits are coded sequentially by one bit, up to the LSBs. In such a manner, more important information is coded first so that bitstreams are generated from the beginning.

The sign values of the quantized values are stored separately and the absolute values thereof are taken to obtain data represented as positive values. The quantized frequency data are sliced into units of bits and then sequentially arranged from the MSB to the LSB. The bit-sliced data are reconstructed by four-dimensional vectors. Now, it is assumed that 8 quantized values each having 4 bits are represented by binary notation as follows:

|     | LSB MSB<br>↓ ↓ |
| --- | --- |
| 0:  | 1001 |
| 1:  | 1000 |
| 2:  | 0101 |
| 3:  | 0010 |
| 4:  | 0000 |
| 5:  | 1000 |
| 6:  | 0000 |
| 7:  | 0100 |

Conventionally, 1001 of the lowest frequency component is first coded and then 1000, 0101, 0010 are sequentially coded (that is, horizontally for each frequency component). However, according to the present invention, 1, the MSB sequences composed of the MSB of the lowest frequency component, and 0, 1, 0, 0 . . . the MSBs of other frequency components, are obtained and then processed sequentially, by being coupled by several bits. For example, in the case of coding in units of 4 bits, 1010 is coded and then 0000 is coded. If the coding of the MSBs is completed, the next upper significant bit sequences are obtained to then be coded in the order of 0001, 000, . . . , up to the LSBs.

The respective four-dimensional vectors coupled in units of four bits are subdivided into two subvectors according to their state. The two subvectors are coded by an effective lossless coding such as Arithmetic coding. To this end, the model to be used in the arithmetic coding for each coding band is decided. This information is stored in the ArModel. The respective arithmetic-coding models are composed of several low-order models. The subvectors are coded using one of the low-order models. The low-order models are classified according to the dimensions of the subvector to be coded, the significance of a vector or the coding states of the respective samples. The significance of a vector is decided by the bit position of the vector to be coded. In other words, according to whether the bit-sliced information is for the MSB, the next MSB, or the LSB, the significance of a vector differs. The MSB has the highest significance and the LSB has the lowest significance. The coding state values of the respective samples are renewed as vector coding progresses from the MSB to the LSB. At first, the coding state value is initialized as zero. Then, when a non-zero bit value is encountered, the coding state value becomes 1.

1.4 Coding of Sign Bit

Basically, the coding of a sign bit is performed sequentially from the MSB sequence to the LSB sequence, where the coding of the frequency component data whose sign bit is coded is reserved and the coding of that whose sign bit is not coded is first performed. After the sign bits of all the frequency components are coded in such a manner, the coding of the reserved frequency component data are performed in the order of the upper significant bit sequences.

This will be described in more detail. Referring back to the above example, the MSB sequences '1010, 0000' are both coded because their sign bits have not been coded previously, that is, there is no need to reserve the coding. Then, the next upper significant bit sequences '0001, 0000' are coded. Here, for 0001, the first 0 and the third 0 are not coded because the sign bits are already coded in the MSBs, and then the second and fourth bits 0 and 1 are coded. Here, since there is no 1 among the upper bits, the sign bit for the frequency component of the fourth bit 1 is coded. For 0000, since there are no coded sign bits among the upper bits, these four bits are all coded. In such a manner, sign bits are coded up to the LSBs, and then the remaining uncoded information is coded sequentially from the upper significant bits.

1.5. Formation of Scalable Bitstreams

Now, the structure of the bitstreams formed in the present invention will be described. When representing the respective frequency component values into binary digits, the MSBs are first coded in the base layer, the next upper significant bits are then coded in the next enhancement layer and the LSBs are finally coded in the top layer. In other words, in the base layer, only the contour of all frequency components is coded. Then, as the bitrate increases, more detailed information can be expressed. Since detailed information data values are coded according to increasing bitrates, i.e., enhancement of layers, and audio quality can be improved.

The method for forming scalable bitstreams using such represented data will now be described. First, bitstreams of the base layer are formed. Then, side information to be used for the base layer is coded. The side information includes scale factor information for scale factor bands and the arithmetic coding model indices for each coding band. If the coding of the side information is completed, the information for the quantized values is sequentially coded from the MSBs to the LSBs, and from low frequency components to high frequency components. If allocated bits of a certain band are less than those of the band being currently coded, coding is not performed. When the allocated bits of the band equal those of the band being currently coded, coding is performed. In other words, coding is performed within a predetermined band limit.

The reason for the band limit will now be described. If there is no band limit in coding signals of the respective enhancement layers, coding is performed from the MSB irrespective of bands. Then, sound objectionable to the ear may be generated because signals are on and off when restoring signals of the layers having low bitrates. Thus, it is advisable to restrict bands appropriately according to bitrates. Also, if the bands are restricted for the respective enhancement layers, the decoder complexity for the respective enhancement layers is reduced. Therefore, both quality scalability and complexity scalability can be supported. After the base layer is coded, the side information and quantized value of audio data for the next enhancement layer are coded. In such a manner, data of all layers are coded. The thus-coded information is collected altogether to form bitstreams.

Figure 4:
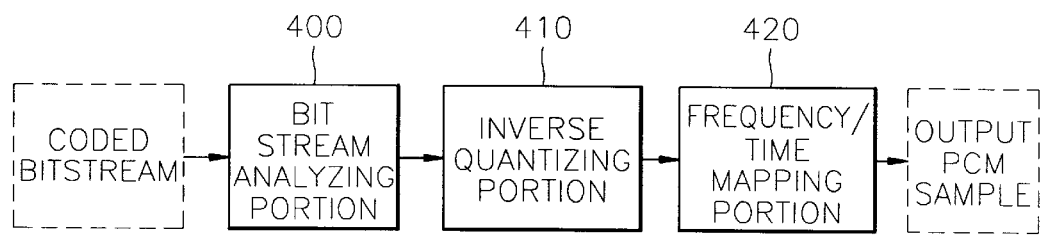
FIG. 4 is a block diagram of a decoding apparatus according to the present invention.

FIG. 4 is a block diagram of the decoding apparatus, which includes a bitstream analyzing portion 400, an inverse quantizing portion 410, and a frequency/time mapping portion 420.

The bitstream analyzing portion 400 decodes side information having at least scale factors and arithmetic coding models, and bit-sliced quantized data, in the order of generation of the bitstreams having a layered structure. The decoded data is restored as a signal of a temporal region by such a processing module as a conventional audio algorithm such as the AAC standards. First, the inverse quantizing portion 410 restores the decoded scale factor and quantized data into signals having the original magnitudes. The frequency/time mapping portion 420 converts inversely quantized signals into signals of a temporal domain so as to be reproduced.

Next, the operation of the decoding apparatus will be described. The order of decoding bitstreams generated by the coding apparatus is exactly the reverse of the coding order. First, the information for the base layer is decoded. The decoding process will be briefly described. First, the information commonly used for all layers, i.e., header information, stored in the foremost bitstream, is first decoded.

The side information used in the base layer includes scale factors and arithmetic model indices for the bands allocated in the base layer. Thus, the scale factors and arithmetic model indices are decoded. The bits allocated to each coding band can be known by the decoded arithmetic model indices. Among the allocated bits, the maximum value is obtained. The quantized values in the bitstreams are decoded sequentially from the MSBs to the LSBs, and from low frequency components to high frequency components, as in the coding process. If the allocated bit of a certain band is smaller than that being currently decoded, decoding is not performed. When the allocated bit of a certain band becomes equal to that being currently decoded, decoding is started.

After completing decoding of the bitstreams allocated for a base layer, side information and quantized values of audio data for the next enhancement layer are decoded. In such a manner, data of all layers can be decoded.

The data quantized through the decoding process is restored as the original signals through the inverse quantizing portion 410 and the frequency/time mapping portion 420 shown in FIG. 4, in the reverse order of the coding.

Now, a preferred embodiment of the present invention will be described. The present invention is adoptable to the base structure of the AAC standards and implements a scalable digital audio data coder. In other words, in the present invention, while the basic modules used in AAC standard coding/decoding are used, only the lossless coding module is replaced with the bit-sliced encoding method. Therefore, the bitstreams formed in the coder according to the present invention are different from those formed in the AAC technique. In the present invention, information for only one bitrate is not coded within one bitstream but information for the bitrates of various enhancement layers is coded within a bitstream, with a layered structure, as shown in FIG. 3, in the order ranging from more important signal components to less important signal components.

Using the thus-formed bitstreams, bitstreams having a low bitrate can be formed by simply rearranging the low bitrate bitstreams contained in the highest bitstream, by a user's request or according to the state of transmission channels. In other words, bitstreams formed by a coding apparatus on a real time basis, or bitstreams stored in a medium, can be rearranged to be suitable for a desired bitrate by a user's request, to then be transmitted. Also, if the user's hardware performance is poor or the user wants to reduce the complexity of a decoder, even with appropriate bitstreams, only some bitstreams can be restored, thereby controlling the complexity.

For example, in forming a scalable bitstream, the bitrate of a base layer is 16 Kbps, that of a top layer is 64 Kbps, and the respective enhancement layers has a bitrate interval of 8 Kbps, that is, the bitstream has 7 layers of 16, 24, 32, 40, 48, 56 and 64 Kbps. The respective enhancement layers are defined as demonstrated in Table 2.1. Since the bitstream formed by the coding apparatus has a layered structure, as shown in FIG. 3, the bitstream of the top layer of 64 Kbps contains the bitstreams of the respective enhancement layers (16, 24, 32, 40, 48, 56 and 64 Kbps). If a user requests data for the top layer, the bitstream for the top layer is transmitted without any processing therefore. Also, if another user requests data for the base layer (corresponding to 16 Kbps), only the leading bitstreams are simply transmitted.

[TABLE 2.1]

Bitrate for each layer (8 kbps interval)

| Layer | Bitrate (kbps) |
|---|---|
| 0 | 16 |
| 1 | 24 |
| 2 | 32 |
| 3 | 40 |
| 4 | 48 |
| 5 | 56 |
| 6 | 64 |

[TABLE 2.2]

Band limit in each layer for short windows (8 kbps interval)

| Layer | Band limit |
|---|---|
| 0 | 20 |
| 1 | 28 |
| 2 | 40 |
| 3 | 52 |
| 4 | 60 |
| 5 | 72 |
| 6 | 84 |

[TABLE 2.3]

Band limit in each layer for long windows (8 kbps interval)

| Layer | Band limit |
|---|---|
| 0 | 160 |
| 1 | 244 |
| 2 | 328 |
| 3 | 416 |
| 4 | 500 |
| 5 | 584 |
| 6 | 672 |

[TABLE 2.4]

Available bits for each channel in each layer (8 kbps interval)

| Layer | Available bits |
|---|---|
| 0 | 341 |
| 1 | 512 |
| 2 | 682 |
| 3 | 853 |
| 4 | 1024 |
| 5 | 1194 |
| 6 | 1365 |

[TABLE 2.5]

Minimum scale factor band newly added to each layer for short windows (8 kbps interval)

| Layer | Scale factor band |
|---|---|
| 0 | 5 |
| 1 | 6 |
| 2 | 8 |
| 3 | 9 |
| 4 | 10 |
| 5 | 11 |
| 6 | 12 |

[TABLE 2.6]

Minimum scale factor band newly added to each layer for long windows (8 kbps interval)

| Layer | Scale factor band |
|---|---|
| 0 | 22 |
| 1 | 27 |
| 2 | 30 |
| 3 | 32 |
| 4 | 35 |
| 5 | 38 |
| 6 | 40 |

Alternatively, the enhancement layers may be constructed in intervals. The bitrate of a base layer is 16 Kbps, that of a top layer is 64 Kbps, and each enhancement layer has a bitrate interval of 1 Kbps. The respective enhancement layers are constructed as demonstrated in Table 3.1. Therefore, fine granule scalability can be implemented, that is, scalable bitstreams are formed in a bitrate interval of 1 kbps from 16 kbps to 64 kbps.

TABLE 3.1

Bitrate for each layer (1 kbps interval)

| Layer | Bitrate |
|---|---|
| 0 | 16 |
| 1 | 17 |
| 2 | 18 |
| 3 | 19 |
| 4 | 20 |
| 5 | 21 |
| 6 | 22 |
| 7 | 23 |
| 8 | 24 |
| 9 | 25 |
| 10 | 26 |
| 11 | 27 |
| 12 | 28 |
| 13 | 29 |
| 14 | 30 |
| 15 | 31 |
| 16 | 32 |
| 17 | 33 |
| 18 | 34 |
| 19 | 35 |
| 20 | 36 |
| 21 | 37 |
| 22 | 38 |
| 23 | 39 |
| 24 | 40 |
| 25 | 41 |
| 26 | 42 |
| 27 | 43 |
| 28 | 44 |
| 29 | 45 |
| 30 | 46 |
| 31 | 47 |
| 32 | 48 |
| 33 | 49 |
| 34 | 50 |
| 35 | 51 |
| 36 | 52 |
| 37 | 53 |
| 38 | 54 |
| 39 | 55 |
| 40 | 56 |
| 41 | 57 |
| 42 | 58 |
| 43 | 59 |
| 44 | 60 |
| 45 | 61 |
| 46 | 62 |
| 47 | 63 |
| 48 | 64 |

TABLE 3.2

Band limit in each layer for short windows (1 kbps interval)

| Layer | Band limit |
|---|---|
| 0 | 20 |
| 1 | 20 |
| 2 | 20 |
| 3 | 24 |
| 4 | 24 |
| 5 | 24 |
| 6 | 28 |
| 7 | 28 |
| 8 | 28 |
| 9 | 32 |
| 10 | 32 |
| 11 | 32 |
| 12 | 36 |
| 13 | 36 |
| 14 | 36 |
| 15 | 40 |
| 16 | 40 |
| 17 | 40 |
| 18 | 44 |
| 19 | 44 |
| 20 | 44 |
| 21 | 48 |
| 22 | 48 |
| 23 | 48 |
| 24 | 52 |
| 25 | 52 |
| 26 | 52 |
| 27 | 56 |
| 28 | 56 |
| 29 | 56 |
| 30 | 60 |
| 31 | 60 |
| 32 | 60 |
| 33 | 64 |
| 34 | 64 |
| 35 | 64 |
| 36 | 68 |
| 37 | 68 |
| 38 | 68 |
| 39 | 72 |
| 40 | 72 |
| 41 | 72 |
| 42 | 76 |
| 43 | 76 |
| 44 | 76 |
| 45 | 80 |

TABLE 3.2-continued

Band limit in each layer for short windows (1 kbps interval)

| Layer | Band limit |
|---|---|
| 46 | 80 |
| 47 | 80 |
| 48 | 84 |

TABLE 3.3

Band limit in each layer for long windows (1 kbps interval)

| Layer | Band limit |
|---|---|
| 0 | 160 |
| 1 | 168 |
| 2 | 180 |
| 3 | 192 |
| 4 | 200 |
| 5 | 212 |
| 6 | 224 |
| 7 | 232 |
| 8 | 244 |
| 9 | 256 |
| 10 | 264 |
| 11 | 276 |
| 12 | 288 |
| 13 | 296 |
| 14 | 308 |
| 15 | 320 |
| 16 | 328 |
| 17 | 340 |
| 18 | 352 |
| 19 | 360 |
| 20 | 372 |
| 21 | 384 |
| 22 | 392 |
| 23 | 404 |
| 24 | 416 |
| 25 | 424 |
| 26 | 436 |
| 27 | 448 |
| 28 | 456 |
| 29 | 468 |
| 30 | 480 |
| 31 | 488 |
| 32 | 500 |
| 33 | 512 |
| 34 | 520 |
| 35 | 532 |
| 36 | 544 |
| 37 | 552 |
| 38 | 564 |
| 39 | 576 |
| 40 | 584 |
| 41 | 596 |
| 42 | 608 |
| 43 | 616 |
| 44 | 628 |
| 45 | 640 |
| 46 | 648 |
| 47 | 660 |
| 48 | 672 |

TABLE 3.4

Available bits per channel in each layer (1 kbps interval)

| Layer | Available bits |
|---|---|
| 0 | 341 |
| 1 | 362 |
| 2 | 384 |

TABLE 3.4-continued

Available bits per channel in each layer (1 kbps interval)

| Layer | Available bits |
|---|---|
| 3 | 405 |
| 4 | 426 |
| 5 | 448 |
| 6 | 469 |
| 7 | 490 |
| 8 | 512 |
| 9 | 533 |
| 10 | 554 |
| 11 | 576 |
| 12 | 597 |
| 13 | 618 |
| 14 | 640 |
| 15 | 661 |
| 16 | 682 |
| 17 | 704 |
| 18 | 725 |
| 19 | 746 |
| 20 | 768 |
| 21 | 789 |
| 22 | 810 |
| 23 | 832 |
| 24 | 853 |
| 25 | 874 |
| 26 | 896 |
| 27 | 917 |
| 28 | 938 |
| 29 | 960 |
| 30 | 981 |
| 31 | 1002 |
| 32 | 1024 |
| 33 | 1045 |
| 34 | 1066 |
| 35 | 1088 |
| 36 | 1109 |
| 37 | 1130 |
| 38 | 1152 |
| 39 | 1173 |
| 40 | 1194 |
| 41 | 1216 |
| 42 | 1237 |
| 43 | 1258 |
| 44 | 1280 |
| 45 | 1301 |
| 46 | 1322 |
| 47 | 1344 |
| 48 | 1365 |

TABLE 3.5

Lowest scale factor band to be newly added in each layer for short windows (1 kbps interval)

| Layer | Scale factor band |
|---|---|
| 0 | 5 |
| 1 | 5 |
| 2 | 5 |
| 3 | 6 |
| 4 | 6 |
| 5 | 6 |
| 6 | 6 |
| 7 | 6 |
| 8 | 6 |
| 9 | 7 |
| 10 | 7 |
| 11 | 7 |
| 12 | 7 |
| 13 | 7 |
| 14 | 7 |

TABLE 3.5-continued

Lowest scale factor band to be newly added in each layer for short windows (1 kbps interval)

| Layer | Scale factor band |
|---|---|
| 15 | 8 |
| 16 | 8 |
| 17 | 8 |
| 18 | 8 |
| 19 | 8 |
| 20 | 8 |
| 21 | 9 |
| 22 | 9 |
| 23 | 9 |
| 24 | 9 |
| 25 | 9 |
| 26 | 9 |
| 27 | 9 |
| 28 | 9 |
| 29 | 9 |
| 30 | 10 |
| 31 | 10 |
| 32 | 10 |
| 33 | 10 |
| 34 | 10 |
| 35 | 10 |
| 36 | 10 |
| 37 | 10 |
| 38 | 10 |
| 39 | 10 |
| 40 | 11 |
| 41 | 11 |
| 42 | 11 |
| 43 | 11 |
| 44 | 11 |
| 45 | 11 |
| 46 | 12 |
| 47 | 12 |
| 48 | 12 |

TABLE 3.6

Lowest scale factor band to be newly added in each layer for long windows (1 kbps interval)

| Layer | Scale factor band |
|---|---|
| 0 | 22 |
| 1 | 23 |
| 2 | 24 |
| 3 | 24 |
| 4 | 25 |
| 5 | 25 |
| 6 | 26 |
| 7 | 26 |
| 8 | 27 |
| 9 | 27 |
| 10 | 27 |
| 11 | 28 |
| 12 | 28 |
| 13 | 29 |
| 14 | 29 |
| 15 | 29 |
| 16 | 30 |
| 17 | 30 |
| 18 | 30 |
| 19 | 31 |
| 20 | 31 |
| 21 | 31 |
| 22 | 32 |
| 23 | 32 |
| 24 | 32 |
| 25 | 32 |
| 26 | 33 |
| 27 | 33 |
| 28 | 34 |
| 29 | 34 |
| 30 | 34 |
| 31 | 35 |
| 32 | 35 |
| 33 | 35 |
| 34 | 36 |
| 35 | 36 |
| 36 | 36 |
| 37 | 37 |
| 38 | 37 |
| 39 | 37 |
| 40 | 38 |
| 41 | 38 |
| 42 | 38 |
| 43 | 39 |
| 44 | 39 |
| 45 | 39 |
| 46 | 40 |
| 47 | 40 |
| 48 | 40 |

The respective layers have limited bandwidths according to bitrates. If 8 kbps interval scalability is intended, the bandwidths are limited, as demonstrated in Tables 2.2 and 2.3. In the case of 1 kbps interval, the bandwidths are limited, as demonstrated in Tables 3.2 and 3.3.

Input data is a PCM data sampled at 48 KHz, and the magnitude of one frame is 1024. The number of bits usable for one frame for a bitrate of 64 Kbps is 1365.3333 (=64000 bits/sec*(1024/48000)) on the average. Similarly, the size of available bits for one frame can be calculated according to the respective bitrates. The calculated numbers of available bits for one frame are demonstrated in Table 2.4 in the case of 8 kbps, and in Table 3.4 in the case of 1 kbps.

2.1. Coding Procedure

The entire coding procedure is the same as that described in MPEG-2 ACC international standards, and the bit-sliced coding proposed in the present invention is adopted as the lossless coding.

2.1.1. Psychoacoustic Portion

Prior to quantization, using a psychoacoustic model, the block type of a frame being currently processed (long, start, short, or stop), the SMR values of the respective processing bands, group information of a short block and temporally delayed PCM data for time/frequency synchronization with the psychoacoustic model, are first generated from input data, and transmitted to a time/frequency mapping portion. ISO/IEC 11172-3 Model 2 is employed for calculating the psychoacoustic model [MPEG Committee ISO/IEC/JTC1/SC29/WG11, Information technology-Coding of moving pictures and associated audio for data storage media to about 1.5 Mbit/s-Part 3: Audio, ISO/OEC IS 11172-3, 1993].

2.1.2. Time/frequency Mapping Portion

The time/frequency mapping defined in the MPEG-2 AAC International standards is used. The time/frequency mapping portion converts data of a temporal domain into data of a frequency domain using MDCT according to the block type output using the psychoacoustic model. At this time, the block sizes are 2048 and 256 in the case of long/start/stop blocks and in the case of a short block, respectively, and MDCT is performed 8 times [MPEG Committee ISO/IEC/JTC1/SC29/WG11, ISO/IEC MPEG-2 AAC IS 13818-7,1997]. The same procedure as that used in the conventional MPEG-2 AAC [MPEG Committee ISO/IEC/JTC1/SC29WG11, ISO/IEC MPEG-2 AAC IS 13818-7, 1997] has been used heretofore.

2.1.3. Quantizing Portion

The data converted into that of a frequency domain is quantized with increasing scale factors so that the SNR value of the scale factor band shown in Tables 1.1 and 1.2 is smaller than the SMR as the output value of the psychoacoustic model. Here, scalar quantization is performed, and the basic scale factor interval is $2^{1/4}$. Quantization is performed so that the perceivable noise is minimized. The exact quantization procedure is described in the MPEG-2 AAC. Here, the obtained output is quantized data and scale factors for the respective scale factor bands.

TABLE 1.1

Scale factor band for long blocks

| swb | swb_offset_long window |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 48 |
| 12 | 56 |
| 13 | 64 |
| 14 | 72 |
| 15 | 80 |
| 16 | 88 |
| 17 | 96 |
| 18 | 108 |
| 19 | 120 |
| 20 | 132 |
| 21 | 144 |
| 22 | 160 |
| 23 | 176 |
| 24 | 196 |
| 25 | 216 |
| 26 | 240 |
| 27 | 264 |
| 28 | 292 |
| 29 | 320 |
| 30 | 352 |
| 31 | 384 |
| 32 | 416 |
| 33 | 448 |
| 34 | 480 |
| 35 | 512 |
| 36 | 544 |
| 37 | 576 |
| 38 | 608 |
| 39 | 640 |
| 40 | 672 |
| 41 | 704 |
| 42 | 736 |
| 43 | 768 |
| 44 | 800 |
| 45 | 832 |
| 46 | 864 |
| 47 | 896 |

TABLE 1.1-continued

Scale factor band for long blocks

| swb | swb_offset_long window |
|---|---|
| 48 | 928 |
|  | 1024 |

[TABLE 1.2]

Scale factor band for short blocks

| swb | swb_offset_short window |
|---|---|
| 0 | 0 |
| 1 | 4 |
| 2 | 8 |
| 3 | 12 |
| 4 | 16 |
| 5 | 20 |
| 6 | 28 |
| 7 | 36 |
| 8 | 44 |
| 9 | 56 |
| 10 | 68 |
| 11 | 80 |
| 12 | 96 |
| 13 | 112 |
|  | 128 |

2.1.4. Arrangement of Frequency Components

Figure 5:
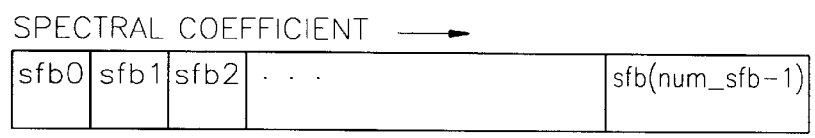
FIG. 5 illustrates the arrangement of frequency components for a long block (window size=2048)
Figure 6:
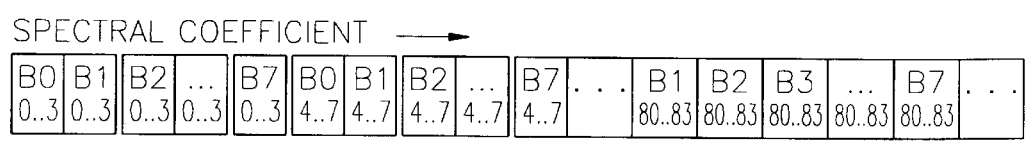
FIG. 6 illustrates the arrangement of frequency components for a short block (window size=2048).

For convenient coding, frequency components are rearranged. The rearrangement order is different depending on block types. In the case of using a long window in the block type, the frequency components are arranged in the order of scale factor bands, as shown in FIG. 5. In FIG. 5, sfb indicates scale factor band. In the case of using a short window in the block type, each four frequency components from eight blocks are repeatedly arranged in increasing order, as shown in FIG. 6. In FIG. 6, B indicates 8 blocks, and the digits listed below indicate frequency components in each block.

2.1.5. Bit Packing Portion Using Bit-sliced Arithmetic Coding (BSAC)

The rearranged quantized data and scale factors are formed as layered bitstreams.

The bitstreams are formed by syntaxes demonstrated in Tables 7.1 through 7.10.

[TABLE 7.1]

Syntax of raw_data_stream ()

| Syntax | No. of bits | Mnemonics |
|---|---|---|
| raw_data_stream () { while (data_available ()){ raw_data_block () byte_alignment () } } | | |

[TABLE 7.2]

Syntax of raw_data_block ()

| Syntax | No. of bits | Mnemonics |
|---|---|---|
| raw_data_block () { | | |
|   while (id = id_syn_ele) ! = ID_END){ | 3 | unimsbf |
|     switch (id){ | | |
|       case ID_SCE: single_channel_element () | | |
|         break; | | |
|       default    : break; | | |
|     } | | |
|   } | | |
| } | | |

[TABLE 7.3]

Syntax of single_channel_element ()

| Syntax | No. of bits | Mnemonics |
|---|---|---|
| single_channel_element () | 4 | unimsbf |
| { | | |
|   element_instant_tag | | |
|   bsac_channel_stream (target_layer) | | |
| } | | |

[TABLE 7.4]

Syntax of ics_info ()

| Syntax | No. of bits | Mnemonics |
|---|---|---|
| ics_info () { | | |
|   Ics_reserved_bit | 1 | bslbf |
|   window_sequence | 2 | uimsbf |
|   window_shape | 1 | uimsbf |
|   If (window_sequence==EIGHT_SHORT_SEQUENCE) { | | |
|     max_sfb | 4 | uimsbf |
|     scale_factor_grouping | 7 | uimsbf |
|   } | | |
|   else { | | |
|     max_sfb | 6 | uimsbf |
|   } | | |
| } | | |

[TABLE 7.5]

Syntax of bsac_channel_stream ()

| Syntax | No. of bits | Mnemonics |
|---|---|---|
| bsac_channel_stream (target_layer) | | |
| { | | |
|   max_sfb | 8 | uimbf |
|   ics_info () | | |
|   bsac_data (target_layer); | | |
| } | | |

[Table 7.6]

Syntax of bsac_data ()

| Syntax | No. of bits | Mnemonics |
|---|---|---|
| bsac_data (target_layer) | | |
| { | | |
|   frame_length | 9 | uimbf |
|   encoded_layer | 3/6 | uimbf |
|   scalefactor_model | 2 | uimbf |
|   min_ArModel | 5 | uimbf |
|   ArModel_model | 2 | uimbf |
|   bsac_stream (target_layer); | | |
|   leftover_arithmetic_codebits | 0...14 | bslbf |
| } | | |

[Table 7.7]

[Table 7.8] Syntax of bsac_stream ()

| Syntax | No. of bits | Mnemonics |
|---|---|---|
| bsac_stream (target_layer) | | |
| { | | |
|   base_initialization (); | | |
|   for (layer=0; layer=<encoded_layer; layer++) | | |
|   { | | |

[Table 7.7]-continued

[Table 7.8] Syntax of bsac_stream ()

| Syntax | No. of bits | Mnemonics |
|---|---|---|
|   bsac_side_info (layer) | | |
|   bsac_spectral_data (layer) | | |
|   if (layer==target_layer) return; | | |
|   } | | |
| } | | |

[Table 7.9]

Syntax of bsac_side_info ()

| Syntax | No. of bits | Mnemonics |
|---|---|---|
| bsac_side_info (layer) {   for (g=0; g<num_window_group; g++)     for (sfb=layer_sfb[layer];sfb<layer_sfb[layer+1];sfb++       acode_scf[g][sfb]   for (sfb=layer_sfb[layer];sfb<layer_sfb[layer+1]; sfb++     for (g=0; g<num_window_group; g++)     {       band= (sfb*num_window_group) + g       for (i=swb_offset[band];i<swb_offset[band+1]; i+=4)       {         cband= index2cd (g, i);         if (!decode_cband[g][cband])         {           acode_Model[g][cband]           decode_cband[g][cband] = 1;         }       }     } } | 0...13<br><br><br><br><br><br><br><br><br><br><br><br>0...13 | bslbf<br><br><br><br><br><br><br><br><br><br><br><br>bslbf |

[Table 7.10]

Syntax of bsac_spectral_data ()

| Syntax | No. of bits | Mnemonics |
|---|---|---|
| bsac_spectral_data (layer) {   layer_initialization (layer);   for (snf=maxsnf; snf>0; snf--)   {     for (i=0; i<last_index; i +=4)     {       if (i >= layer_index) continue;       if (cur_snf[i] <snf) continue;       amodel_selection ()       dim0 = dim1 = 0       for (k = 0; k<4; k++)         if (prestate [i+k]) dim1++         else   dim0++       if (dim0)         acode_vec0       if (dim1)         acode_vec1       construct_sample ();       for (k=0; k < 4; k++)       {         if (sample[i+k] &&! Prestate[i+k])         {           acode_sign           prestate[i+k] = 1         }       }       cur_snf[i]--       if(total_estimated_bits>=available_bits[layer])return     }     if (total_estimated_bits>=avaiable_bits[layer])return   } } | <br><br><br><br><br><br><br><br><br><br><br><br><br>0...14<br><br>0...14<br><br><br><br><br><br>0...1 | <br><br><br><br><br><br><br><br><br><br><br><br><br>bslbf<br><br>bslbf<br><br><br><br><br><br>bslbf |

The leading elements of a bitstream are elements which can be commonly used in the conventional AAC, and the elements newly proposed in the present invention are specifically explained. However, the principal structure is similar to that of the AAC standards. Next, the elements of a bitstream newly proposed in the present invention will be described.

Table 7.5 shows the syntax for coding bsac_channel_stream, in which 'max_scalefactor' represents the maximum scale factors, which is an integer, i.e., 8 bits.

Table 7.6 shows the syntax for coding bsac_data, in which 'frame_length' represents the size of all bitstreams for one frame, which is expressed in units of bytes. Also, 'encoded_layer' represents the coding for the top layer coded in the bitstream, which is 3 bits in the case of 8 kbps interval and 6 bits in the case of 1 kbps interval, respectively. The information for the enhancement layers is demonstrated in Tables 2.1 and 3.1. Also, 'scalefactor_model' represents information concerning models to be used in arithmetic-coding differences in scale factors. These models are shown in Table 4.1. 'min_ArModel' represents the minimum value of the arithmetic coding model indices. 'ArModel_model' represents information concerning models used in arithmetic-coding a difference signal between the ArModel and min_ArModel. This information is shown in Table 4.2.

TABLE 4.1

Arithmetic Model of differential scale factor

| Model number | Largest differential scale factor | Model listed table |
|---|---|---|
| 0 | 7 | Table 5.1 |
| 1 | 15 | Table 5.2 |
| 2 | 31 | Table 5.3 |
| 3 | 63 | Table 5.4 |

TABLE 4.2

Arithmetic Model of differential ArModel

| Model number | Largest differential scale factor | Model listed table |
|---|---|---|
| 0 | 3 | Table 5.5 |
| 1 | 7 | Table 5.6 |
| 2 | 15 | Table 5.7 |
| 3 | 31 | Table 5.8 |

Table 7.9 shows the syntax for coding bsac_side_info. The information which can be used for all layers is first coded and then the side information commonly used for the respective enhancement layers is coded. 'acode_scf' represents a codeword obtained by arithmetic-coding the scale factors. 'acode_ArModel' represents a codeword obtained by arithmetic-coding the ArModel. The ArModel is information on which is selected from the models listed in Table 4.3.

TABLE 4.3

BSAC Arithmetic Model Parameters

| ArModel index | Allocated bits of coding band | Model listed table |
|---|---|---|
| 0 | 0 | Table 6.1 |
| 1 | — | Not used |
| 2 | 1 | Table 6.2 |
| 3 | 1 | Table 6.3 |
| 4 | 2 | Table 6.4 |
| 5 | 2 | Table 6.5 |
| 6 | 3 | Table 6.6 |
| 7 | 3 | Table 6.7 |
| 8 | 4 | Table 6.8 |
| 9 | 4 | Table 6.9 |
| 10 | 5 | Table 6.10 |
| 11 | 5 | Table 6.11 |
| 12 | 6 | Table 6.12 |
| 13 | 6 | Table 6.13 |
| 14 | 7 | Table 6.14 |
| 15 | 7 | Table 6.15 |
| 16 | 8 | Table 6.16 |
| 17 | 8 | Table 6.17 |
| 18 | 9 | Table 6.18 |
| 19 | 9 | Table 6.19 |
| 20 | 10 | Table 6.20 |

TABLE 4.3-continued

BSAC Arithmetic Model Parameters

| ArModel index | Allocated bits of coding band | Model listed table |
|---|---|---|
| 21 | 10 | Table 6.21 |
| 22 | 11 | Table 6.22 |
| 23 | 11 | Table 6.23 |
| 24 | 12 | Table 6.24 |
| 25 | 12 | Table 6.25 |
| 26 | 13 | Table 6.26 |
| 27 | 13 | Table 6.27 |
| 28 | 14 | Table 6.28 |
| 29 | 14 | Table 6.29 |
| 30 | 15 | Table 6.30 |
| 31 | 15 | Table 6.31 |

TABLE 6.1

BSAC Arithmetic Model 0

Allocated bit = 0
BSAC arithmetic model 1
Not used

TABLE 6.2

BSAC Arithmetic Model 2
Allocated bit = 1

| snf | pre_state | dimension | Cumulative frequencies |
|---|---|---|---|
| 1 | 0 | 4 | 14858, 13706, 12545, 11545, 10434, 9479, 8475, 7619, 6457, 5456, 4497, 3601, 2600, 1720, 862, 0 |

TABLE 6.3

BSAC Arithmetic Model 3
Allocated bit = 1

| snf | pre_state | dimension | Cumulative frequencies |
|---|---|---|---|
| 1 | 0 | 4 | 5476, 4279, 3542, 3269, 2545, 2435, 2199, 2111, 850, 739, 592, 550, 165, 21, 0 |

TABLE 6.4

BSAC Arithmetic Model 4
Allocated bits = 2

| snf | pre_state | dimension | Cumulative frequencies |
|---|---|---|---|
| 2 | 0 | 4 | 4299, 3445, 2583, 2473, 1569, 1479, 1371, 1332, 450, 347, 248, 219, 81, 50, 15, 0 |
| 1 | 0 | 4 | 15290, 14389, 13434, 12485, 11559, 10627, 9683, 8626, 7691, 5767, 4655, 3646, 2533, 1415, 0 |
|  |  | 3 | 15139, 13484, 11909, 9716, 8068, 5919, 3590, 0 |
|  |  | 2 | 14008, 10384, 6834, 0 |
|  |  | 1 | 11228, 0 |
|  | 1 | 4 | 10355, 9160, 7553, 7004, 5671, 4902, 4133, 3433, 1908, 1661, 1345, 1222, 796, 714, 233, 0 |
|  |  | 3 | 8328, 6615, 4466, 3586, 1759, 1062, 321, 0 |

TABLE 6.4-continued

BSAC Arithmetic Model 4
Allocated bits = 2

| snf | pre_state | dimension | Cumulative frequencies |
|---|---|---|---|
| | | 2 | 4631, 2696, 793, 0 |
| | | 1 | 968, 0 |

TABLE 6.5

BSAC Arithmetic Model 5
Allocated bits = 2

| snf | pre_state | dimension | Cumulative frequencies |
|---|---|---|---|
| 2 | 0 | 4 | 3119, 2396, 1878, 1619, 1076, 1051, 870, 826, 233, 231, 198, 197, 27, 26, 1, 0 |
| 1 | 0 | 4 | 3691, 2897, 2406, 2142, 1752, 1668, 1497, 1404, 502, 453, 389, 368, 131, 102, 18, 0 |

TABLE 6.5-continued

BSAC Arithmetic Model 5

Allocated bits = 2

| snf | pre_state | dimension | Cumulative frequencies |
|---|---|---|---|
| | | 3 | 11106, 8393, 6517, 4967, 2739, 2200, 608, 0 |
| | | 2 | 10771, 6410, 2619, 0 |
| | | 1 | 6112, 0 |
| | 1 | 4 | 11484, 10106, 7809, 7043, 5053, 3521, 2756, 2603, 2296, 2143, 1990, 1531, 765, 459, 153, 0 |
| | | 3 | 10628, 8930, 6618, 4585, 2858, 2129, 796, 0 |
| | | 2 | 7596, 4499, 1512, 0 |
| | | 1 | 4155, 0 |

TABLE 6.6

BSAC Arithmetic Model 6
Allocated bits = 3

| snf | pre_state | dimension | Cumulative frequencies |
|---|---|---|---|
| 3 | 0 | 4 | 2845, 2371, 1684, 1524, 918, 882, 760, 729, 200, 198, 180, 178, 27, 25, 1, 0 |
| 2 | 0 | 4 | 1621, 1183, 933, 775, 645, 628, 516, 484, 210, 207, 188, 186, 39, 35, 1, 0 |
| | | 3 | 8800, 6734, 4886, 3603, 1326, 1204, 104, 0 |
| | | 2 | 8869, 5163, 1078, 0 |
| | | 1 | 3575, 0 |
| | 1 | 4 | 12603, 12130, 10082, 9767, 8979, 8034, 7404, 6144, 4253, 3780, 3150, 2363, 1575, 945, 630, 0 |
| | | 3 | 10410, 8922, 5694, 4270, 2656, 1601, 533, 0 |
| | | 2 | 8459, 5107, 1670, 0 |
| | | 1 | 4003, 0 |
| 1 | 0 | 4 | 5185, 4084, 3423, 3010, 2406, 2289, 2169, 2107, 650, 539, 445, 419, 97, 61, 15, 0 |
| | | 3 | 13514, 11030, 8596, 6466, 4345, 3250, 1294, 0 |
| | | 2 | 13231, 8754, 4635, 0 |
| | | 1 | 9876, 0 |
| | 1 | 4 | 14091, 12522, 11247, 10299, 8928, 7954, 6696, 6024, 4766, 4033, 3119, 2508, 1594, 1008, 353, 0 |
| | | 3 | 12596, 10427, 7608, 6003, 3782, 2580, 928, 0 |
| | | 2 | 10008, 6213, 2350, 0 |
| | | 1 | 5614, 0 |

TABLE 6.7

BSAC Arithmetic Model 7
Allocated bits = 3

| snf | pre_state | dimension | Cumulative frequencies |
|---|---|---|---|
| 3 | 0 | 4 | 3833, 3187, 2542, 2390, 1676, 1605, 1385, 1337, 468, 434, 377, 349, 117, 93, 30, 0 |
| 2 | 0 | 4 | 6621, 5620, 4784, 4334, 3563, 3307, 2923, 2682, 1700, 1458, 1213, 1040, 608, 431, 191, 0 |
| | | 3 | 11369, 9466, 7519, 6138, 3544, 2441, 1136, 0 |

TABLE 6.7-continued

BSAC Arithmetic Model 7
Allocated bits = 3

| snf | pre_state | dimension | Cumulative frequencies |
|---|---|---|---|
| | | 2 | 11083, 7446, 3439, 0 |
| | | 1 | 8823, 0 |
| | 1 | 4 | 12027, 11572, 9947, 9687, 9232, 8126, 7216, 6176, 4161, 3705, 3055, 2210, 1235, 780, 455, 0 |
| | | 3 | 9566, 7943, 4894, 3847, 2263, 1596, 562, 0 |
| | | 2 | 7212, 4217, 1240, 0 |
| | | 1 | 3296, 0 |
| 1 | 0 | 4 | 14363, 13143, 12054, 11153, 10220, 9388, 8609, 7680, 6344, 5408, 4578, 3623, 2762, 1932, 1099, 0 |
| | | 3 | 14785, 13256, 11596, 9277, 7581, 5695, 3348, 0 |
| | | 2 | 14050, 10293, 6547, 0 |
| | | 1 | 10948, 0 |
| | 1 | 4 | 13856, 12350, 11151, 10158, 8816, 7913, 6899, 6214, 4836, 4062, 3119, 2505, 1624, 1020, 378, 0 |
| | | 3 | 12083, 9880, 7293, 5875, 3501, 2372, 828, 0 |
| | | 2 | 8773, 5285, 1799, 0 |
| | | 1 | 4452, 0 |

TABLE 6.8

BSAC Arithmetic Model 8
Allocated bits = 4

| snf | pre_state | dimension | Cumulative frequencies |
|---|---|---|---|
| 4 | 0 | 4 | 2770, 2075, 1635, 1511, 1059, 1055, 928, 923, 204, 202, 190, 188, 9, 8, 1, 0 |
| 3 | 0 | 4 | 1810, 1254, 1151, 1020, 788, 785, 767, 758, 139, 138, 133, 132, 14, 13, 1, 0 |
| | | 3 | 7113, 4895, 3698, 3193, 1096, 967, 97, 0 |
| | | 2 | 6858, 4547, 631, 0 |
| | | 1 | 4028, 0 |
| | 1 | 4 | 13263, 10922, 10142, 9752, 8582, 7801, 5851, 5071, 3510, 3120, 2730, 2340, 1560, 780, 390, 0 |
| | | 3 | 12675, 11275, 7946, 6356, 4086, 2875, 1097, 0 |
| | | 2 | 9473, 5781, 1840, 0 |
| | | 1 | 3597, 0 |
| 2 | 0 | 4 | 2600, 1762, 1459, 1292, 989, 983, 921, 916, 238, 233, 205, 202, 32, 30, 3, 0 |
| | | 3 | 10797, 8840, 6149, 5050, 2371, 1697, 483, 0 |
| | | 2 | 10571, 6942, 2445, 0 |
| | | 1 | 7864, 0 |
| | 1 | 4 | 14866, 12983, 11297, 10398, 9386, 8683, 7559, 6969, 5451, 4721, 3484, 3007, 1882, 1208, 590, 0 |
| | | 3 | 12611, 10374, 8025, 6167, 4012, 2608, 967, 0 |
| | | 2 | 10043, 6306, 2373, 0 |
| | | 1 | 5766, 0 |
| 1 | 0 | 4 | 6155, 5057, 4328, 3845, 3164, 2977, 2728, 2590, 1341, 1095, 885, 764, 303, 188, 74, 0 |
| | | 3 | 12802, 10407, 8142, 6263, 3928, 3013, 1225, 0 |
| | | 2 | 13131, 9420, 4928, 0 |
| | | 1 | 10395, 0 |
| | 1 | 4 | 14536, 13348, 11819, 11016, 9340, 8399, 7135, 6521, 5114, 4559, 3521, 2968, 1768, 1177, 433, 0 |
| | | 3 | 12735, 10606, 7861, 6011, 3896, 2637, 917, 0 |
| | | 2 | 9831, 5972, 2251, 0 |
| | | 1 | 4944, 0 |

TABLE 6.9

BSAC Arithmetic Model 9
Allocated bits = 4

| snf | pre_state | dimension | Cumulative frequencies |
|---|---|---|---|
| 4 | 0 | 4 | 3383, 2550, 1967, 1794, 1301, 1249, 1156, 1118, 340, 298, 247, 213, 81, 54, 15, 0 |
| 3 | 0 | 4 | 7348, 6275, 5299, 4935, 3771, 3605, 2962, 2818, |

TABLE 6.9-continued

BSAC Arithmetic Model 9
Allocated bits = 4

| snf | pre_state | dimension | Cumulative frequencies |
|---|---|---|---|
|  |  |  | 1295, 1143, 980, 860, 310, 230, 75, 0 |
|  |  | 3 | 9531, 7809, 5972, 4892, 2774, 1782, 823, 0 |
|  |  | 2 | 11455, 7068, 3383, 0 |
|  |  | 1 | 9437, 0 |
|  | 1 | 4 | 12503, 9701, 8838, 8407, 6898, 6036, 4527, 3664, 2802, 2586, 2371, 2155, 1293, 431, 215, 0 |
|  |  | 3 | 11268, 9422, 6508, 5277, 3076, 2460, 1457, 0 |
|  |  | 2 | 7631, 3565, 1506, 0 |
|  |  | 1 | 2639, 0 |
| 2 | 0 | 4 | 11210, 9646, 8429, 7389, 6252, 5746, 5140, 4692, 3350, 2880, 2416, 2014, 1240, 851, 404, 0 |
|  |  | 3 | 12143, 10250, 7784, 6445, 3954, 2528, 1228, 0 |
|  |  | 2 | 10891, 7210, 3874, 0 |
|  |  | 1 | 9537, 0 |
|  | 1 | 4 | 14988, 13408, 11860, 10854, 9631, 8992, 7834, 7196, 5616, 4793, 3571, 2975, 1926, 1212, 627, 0 |
|  |  | 3 | 12485, 10041, 7461, 5732, 3669, 2361, 940, 0 |
|  |  | 2 | 9342, 5547, 1963, 0 |
|  |  | 1 | 5410, 0 |
| 1 | 0 | 4 | 14152, 13258, 12486, 11635, 11040, 10290, 9740, 8573, 7546, 6643, 5903, 4928, 4005, 2972, 1751, 0 |
|  |  | 3 | 14895, 13534, 12007, 9787, 8063, 5761, 3570, 0 |
|  |  | 2 | 14088, 10108, 6749, 0 |
|  |  | 1 | 11041, 0 |
|  | 1 | 4 | 14817, 13545, 12244, 11281, 10012, 8952, 7959, 7136, 5791, 4920, 3997, 3126, 2105, 1282, 623, 0 |
|  |  | 3 | 12873, 10678, 8257, 6573, 4186, 2775, 1053, 0 |
|  |  | 2 | 9969, 6059, 2363, 0 |
|  |  | 1 | 5694, 0 |

TABLE 6.10

BSAC Arithmetic Model 10
Allocated bits (Abit) = 5

| snf | pre_state | dimension | Cumulative frequencies |
|---|---|---|---|
| Abit | 0 | 4 | 2335, 1613, 1371, 1277, 901, 892, 841, 833, 141, 140, 130, 129, 24, 23, 1, 0 |
| Abit-1 | 0 | 4 | 1746, 1251, 1038, 998, 615, 611, 583, 582, 106, 104, 101, 99, 3, 2, 1, 0 |
|  |  | 3 | 7110, 5230, 4228, 3552, 686, 622, 46, 0 |
|  |  | 2 | 6101, 2575, 265, 0 |
|  |  | 1 | 1489, 0 |
|  | 1 | 4 | 13010, 12047, 11565, 11083, 9637, 8673, 6264, 5782, 4336, 3855, 3373, 2891, 2409, 1927, 963, 0 |
|  |  | 3 | 10838, 10132, 8318, 7158, 5595, 3428, 2318, 0 |
|  |  | 2 | 8209, 5197, 1287, 0 |
|  |  | 1 | 4954, 0 |
| Abit-2 | 0 | 4 | 2137, 1660, 1471, 1312, 1007, 1000, 957, 951, 303, 278, 249, 247, 48, 47, 1, 0 |
|  |  | 3 | 9327, 7413, 5073, 4391, 2037, 1695, 205, 0 |
|  |  | 2 | 8658, 5404, 1628, 0 |
|  |  | 1 | 5660, 0 |
|  | 1 | 4 | 13360, 12288, 10727, 9752, 8484, 7899, 7119, 6631, 5363, 3900, 3023, 2535, 1852, 1267, 585, 0 |
|  |  | 3 | 13742, 11685, 8977, 7230, 5015, 3427, 1132, 0 |
|  |  | 2 | 10402, 6691, 2828, 0 |
|  |  | 1 | 5298, 0 |
| Abit-3 | 0 | 4 | 4124, 3181, 2702, 2519, 1949, 1922, 1733, 1712, 524, 475, 425, 407, 78, 52, 15, 0 |
|  |  | 3 | 10829, 8581, 6285, 4865, 2539, 1920, 594, 0 |
|  |  | 2 | 11074, 7282, 3092, 0 |
|  |  | 1 | 8045, 0 |
|  | 1 | 4 | 14541, 13343, 11637, 10862, 9328, 8783, 7213, 6517, 5485, 5033, 4115, 3506, 2143, 1555, 509, 0 |
|  |  | 3 | 13010, 11143, 8682, 7202, 4537, 3297, 1221, 0 |

TABLE 6.10-continued

BSAC Arithmetic Model 10
Allocated bits (Abit) = 5

| snf | pre_state | dimension | Cumulative frequencies |
|---|---|---|---|
| | | 2 | 9941, 5861, 2191, 0 |
| | | 1 | 5340, 0 |
| Other snf | 0 | 4 | 9845, 8235, 7126, 6401, 5551, 5131, 4664, 4320, 2908, 2399, 1879, 1506, 935, 603, 277, 0 |
| | | 3 | 13070, 11424, 9094, 7203, 4771, 3479, 1486, 0 |
| | | 2 | 13169, 9298, 5406, 0 |
| | | 1 | 10371, 0 |
| | 1 | 4 | 14766, 13685, 12358, 11442, 10035, 9078, 7967, 7048, 5824, 5006, 4058, 3400, 2350, 1612, 659, 0 |
| | | 3 | 13391, 11189, 8904, 7172, 4966, 3183, 1383, 0 |
| | | 2 | 10280, 6372, 2633, 0 |
| | | 1 | 5419, 0 |

TABLE 6.11

BSAC Arithmetic Model 11
Allocated bits (Abit) = 5

| snf | pre_state | dimension | Cumulative frequencies |
|---|---|---|---|
| Abit | 0 | 4 | 2872, 2294, 1740, 1593, 1241, 1155, 1035, 960, 339, 300, 261, 247, 105, 72, 34, 0 |
| Abit-1 | 0 | 4 | 3854, 3090, 2469, 2276, 1801, 1685, 1568, 1505, 627, 539, 445, 400, 193, 141, 51, 0 |
| | | 3 | 10654, 8555, 6875, 4976, 3286, 2229, 826, 0 |
| | | 2 | 10569, 6180, 2695, 0 |
| | | 1 | 6971, 0 |
| | 1 | 4 | 11419, 11170, 10922, 10426, 7943, 6950, 3723, 3475, 1737, 1489, 1241, 992, 744, 496, 248, 0 |
| | | 3 | 1101.3, 9245, 6730, 4962, 3263, 3263, 1699, 883, 0 |
| | | 2 | 6969, 4370, 1366, 0 |
| | | 1 | 3166, 0 |
| Abit-2 | 0 | 4 | 9505, 8070, 6943, 6474, 5305, 5009, 4290, 4029, 2323, 1911, 1591, 1363, 653, 443, 217, 0 |
| | | 3 | 11639, 9520, 7523, 6260, 4012, 2653, 1021, 0 |
| | | 2 | 12453, 8284, 4722, 0 |
| | | 1 | 9182, 0 |
| | 1 | 4 | 13472, 12294, 10499 9167, 7990, 7464, 6565, 6008, 4614, 3747, 2818, 2477, 1641, 1084, 557, 0 |
| | | 3 | 13099, 10826, 8476, 6915, 4488, 2966, 1223, 0 |
| | | 2 | 9212, 5772, 2053, 0 |
| | | 1 | 4244, 0 |
| Abit-3 | 0 | 4 | 14182, 12785, 11663, 10680, 9601, 8748, 8135, 7353, 6014, 5227, 4433, 3727, 2703, 1818, 866, 0 |
| | | 3 | 13654, 11814, 9714, 7856, 5717, 3916, 2112, 0 |
| | | 2 | 12497, 8501, 4969, 0 |
| | | 1 | 10296, 0 |
| | 1 | 4 | 15068, 13770, 12294, 11213, 10230, 9266, 8439, 7438, 6295, 5368, 4361, 3620, 2594, 1797, 895, 0 |
| | | 3 | 13120, 10879, 8445, 6665, 4356, 2794, 1047, 0 |
| | | 2 | 9311, 5578, 1793, 0 |
| | | 1 | 4695, 0 |
| Other snf | 0 | 4 | 15173, 14794, 14359, 13659, 13224, 12600, 11994, 11067, 10197, 9573, 9081, 7624, 6697, 4691, 3216, 0 |
| | | 3 | 15328, 13985, 12748, 10084, 8587, 6459, 4111, 0 |
| | | 2 | 14661, 11179, 7924, 0 |
| | | 1 | 11399, 0 |
| | 1 | 4 | 14873, 13768, 12458, 11491, 10229, 9164, 7999, 7186, 5992, 5012, 4119, 3369, 2228, 1427, 684, 0 |
| | | 3 | 13063, 10913, 8477, 6752, 4529, 3047, 1241, 0 |
| | | 2 | 10101, 6369, 2615, 0 |
| | | 1 | 5359, 0 |

[Table 6.12] ASAC Arithmetic Modeld 12 Same as BSAC arithmetic model 10, but allocated bit=6

[Table 6.13] ASAC Arithmetic Modeld 13 Same as BSAC arithmetic model 11, but allocated bit=6

[Table 6.14] ASAC Arithmetic Modeld 14 Same as BSAC arithmetic Modeld 10, but allocated bit=7

[Table 6.15] ASAC Arithmetic Modeld 15 Same as BSAC arithmetic model 11, but allocated bit=7

[Table 6.16] ASAC Arithmetic Modeld 16 Same as BSAC arithmetic model 10, but allocated bit=8

[Table 6.17] ASAC Arithmetic Modeld 17 Same as BSAC arithmetic model 11, but allocated bit=8

[Table 6.18] ASAC Arithmetic Modeld 18 Same as BSAC arithmetic model 10, but allocated bit=9

[Table 6.19] ASAC Arithmetic Modeld 19 Same as BSAC arithmetic model 11, but allocated bit=9

[Table 6.20] ASAC Arithmetic Modeld 20 Same as BSAC arithmetic model 10, but allocated bit=10

[Table 6.21] ASAC Arithmetic Modeld 21 Same as BSAC arithmetic model 11, but allocated bit=10

[Table 6.22] ASAC Arithmetic Modeld 22 Same as BSAC arithmetic model 10, but allocated bit=11

[Table 6.23] ASAC Arithmetic Modeld 23 Same as BSAC arithmetic model 11, but allocated bit=11

[Table 6.24] ASAC Arithmetic Modeld 24 Same as BSAC arithmetic model 10, but allocated bit=12

[Table 6.25] ASAC Arithmetic Modeld 25 Same as BSAC arithmetic model 11, but allocated bit=12

[Table 6.26] ASAC Arithmetic Modeld 26 Same as BSAC arithmetic model 10, but allocated bit=13

[Table 6.27] ASAC Arithmetic Modeld 27 Same as BSAC arithmetic model 11, but allocated bit=13

[Table 6.28] ASAC Arithmetic Modeld 28 Same as BSAC arithmetic Model 10, but allocated bit=14

[Table 6.29] ASAC Arithmetic Modeld 29 Same as BSAC arithmetic model 11, but allocated bit=14

[Table 6.30] ASAC Arithmetic Modeld 30 Same as BSAC arithmetic model 10, but allocated bit=15

[Table 6.31] ASAC Arithmetic Modeld 31 Same as BSAC arithmetic model 11, but allocated bit=15

Table 7.10 shows the syntax for coding bsac_spectral_data. The side information commonly used for the respective enhancement layers, the quantized frequency components are bit-sliced using the BSAC technique. and then arithmetic-coded. 'acode_vec0' represents a codeword obtained by arithmetic-coding the first subvector (subvector 0) using the arithmetic model defined as the ArModel value. 'acode_vec1' represents a codeword obtained by arithmetic-coding the second subvector (subvector 1) using the arithmetic model defined as the ArModel value. 'acode_sign' represents a codeword obtained by arithmetic-coding the sign bit using the arithmetic model defined in Table 5.9.

TABLE 5.9

| size | Sign arithmetic model Cumulative frequencies |
|---|---|
| 2 | 8192, 0 |

While the number of bits used in coding the respective subvectors are calculated and compared with the number of available bits for the respective enhancement layers, when the used bits are equal to or more than the available bits, the coding of the next enhancement layer is newly started.

In the case of a long block, since the bandwidth of the base layer is limited up to the 21st scale factor band. Then, the scale factors up to the 21st scale factor band and the arithmetic coding models of the corresponding coding bands are coded. The bit allocation information is obtained from the arithmetic coding models. The maximum value of the allocated bits is obtained from the bit information allotted to each coding band, and coding is performed from the maximum quantization bit value by the aforementioned encoding method. Then, the next quantized bits are sequentially coded. If allocated bits of a certain band are less than those of the band being currently coded, coding is not performed. When allocated bits of a certain band are the same as those of the band being currently coded, the band is coded for the first time. Since the bitrate of the base layer is 16 Kbps, the entire bit allowance is 336 bits. Thus, the total used bit quantity is calculated continuously and coding is terminated at the moment the bit quantity exceeds 336.

After all bitstreams for the base layer (16 Kbps) are formed, the bitstreams for the next enhancement layer are formed. Since the limited bandwidths are increased for the higher layers, the coding of scale factors and arithmetic coding models is performed only for the newly added bands to the limited bands for the base layer. In the base layer, uncoded bit-sliced data for each band and the bit-sliced data of a newly added band are coded from the MSBs in the same manner as in the base layer. When the total used bit quantity is larger than the available bit quantity, coding is terminated and preparation for forming the next enhancement layer bitstreams is made. In this manner, bitstreams for the remaining layers of 32, 40, 48, 56 and 64 Kbps can be generated.

Now, the decoding procedure will be described.

3.1. Analysis and Decoding of Bitstreams 3.1.1. Decoding of bsac_channel_stream

The decoding of bsac_channel_stream is performed in the order from Get max_scale factor to Get ics_info ( ) and to Get BSAC data, as demonstrated in Table 7.5.

3.1.2. Decoding of bsac_data

The side information necessary in decoding frame_length, encoded_layer, scale factor models and arithmetic models is decoded in the bitstream, as demonstrated in Table 7.6.

3.1.3. Decoding of bsac_side_info

The scalable bitstreams formed in the above have a layered structure. First, the side information for the base layer is separated from the bitstream and then decoded. Then, the bit-sliced information for the quantized frequency components contained in the bitstream of the base layer is separated from the bitstream and then decoded. The same decoding procedure as that for the base layer is applied to other enhancement layers.

1) Decoding of Scale Factors

The frequency components are divided into scale factor bands having frequency coefficients that are multiples of 4. Each scale factor band has a scale factor. The max_scalefactor is decoded into an 8-bit unsigned integer. For all scale factors, differences between the scale factors and the max_scalefactor are obtained and then arithmetic-decoded. The arithmetic models used in decoding the differences are one of elements forming the bitstreams, and are separated from the bitstreams having been already decoded. The original scale factors can be restored in the reverse order of the coding procedure.

The following pseudo code describes the decoding method for the scale factors in the base layer and the other enhancement layers.

```
for (g=0; g<num_window_group; g++) {
    for (sfb=layer_sfb[layer]; sfb<layer_sfb[layer+1]; sfb++) {
        sf[g][sfb]=max_scalefactor - arithmetic_decoding( );
    }
}
```

Here, layers_sfb[layer] is a start scale factor band for decoding scale factors in the respective enhancement layers, and layer_sfb[layer+1] is an end scale factor band.

2) Decoding of Arithmetic Model Index

The frequency components are divided into coding bands having 32 frequency coefficients to be losslessly coded. The coding band is a basic unit used in the lossless coding. The arithmetic coding model index is information on the models used in arithmetic-coding/decoding the bit-sliced data of each coding band, indicating which model is used in the arithmetic-coding/decoding procedures, among the models listed in Table 4.3.

Differences between an offset value and all arithmetic coding model indices are calculated and then difference signals are arithmetic-coded using the models listed in Table 4.2. Here, among four models listed in Table 4.2, a model to be used is indicated by the value of ArModel_model and is stored in the bitstream as 2 bits. The offset value is 5-bit min_ArModel value stored in the bitstream. The difference signals are decoded in the reverse order of the coding procedure and then the difference signals are added to the offset value to restore the arithmetic coding model indices.

The following pseudo code describes the decoding method for the arithmetic coding model indices and ArModel[cband] in the respective enhancement layers.

```
for (sfb=layer_sfb[layer]; sfb<layer_sfb[layer+1]; sfb++)
    for (g=0; g<num_window_group; g++) {
        band=(sfb*num_window_group) + g
        for (i=0;i<swb_offset[band];i<swb_offset[band+1];i+=4){
            cband=index2cb(g, i);
            if (!decode_cband[ch][g][cband]){
                ArModel[g][cband]=min_ArModel+arithmetic_decoding ( )
                decode_cband[ch][g][cband]=1;
            }
        }
    }
```

Here, layer_sfb[layer] is a start scale factor band for decoding arithmetic coding model indices in the respective enhancement layers, and layer_sfb[layer+1] is an end scale factor band. decode_cband[ch][g][cband] is a flag indicative of whether an arithmetic coding model has been decoded (1) or has not been decoded (0).

3.1.4. Decoding of Bit-sliced Data

The quantized sequences are formed as bit-sliced sequences. The respective four-dimensional vectors are subdivided into two subvectors according to their state. For effective compression, the two subvectors are arithmetic-coded as a lossless coding. The model to be used in the arithmetic coding for each coding band is decided. This information is stored in the ArModel.

As demonstrated in Tables 6.1 through 6.31, the respective arithmetic-coding models are composed of several low-order models. The subvectors are coded using one of the low-order models. The low-order models are classified according to the dimension of the subvector to be coded, the significance of a vector or the coding states of the respective samples. The significance of a vector is decided by the bit position of the vector to be coded. In other words, according to whether the bit-sliced information is for the MSB, the next MSB, or the LSB, the significance of a vector differs. The MSB has the highest significance and the LSB has the lowest significance. The coding state values of the respective samples are renewed as the vector coding is progressed from the MSB to the LSB. At first, the coding state value is initialized as zero. Then, when a non-zero bit value is encountered, the coding state value becomes 1.

The two subvectors are one- through four-dimensional vectors. The subvectors are arithmetic-coded from the MSB to the LSB, from lower frequency components to higher frequency components. The arithmetic coding model indices used in the arithmetic-coding are previously stored in the bitstream in the order from low frequency to high frequency, before transmitting the bit-sliced data to each coding band in units of coding bands.

The respective bit-sliced data is arithmetic-coded to obtain the codeword indices. These indices are restored into the original quantized data by being bit-coupled using the following pseudo code.

'pre_state[]' is a state indicative of whether the currently decoded value is 0 or not. 'snf' is significance of a decoded vector. 'Idx0' is a codeword index whose previous state is 0. 'idx1' is a codeword index whose previous state is 1. 'dec_sample[]' is decoded data. 'start_i' is a start frequency line of decoded vectors.

```
for (i=start_i; i<(start_i+4); i++) {
    if (pre___state[i]) {
        if (idx1 & 0x01)
            dec_sample[i]|=(1<<(snf-1))
        idx1>>=1;
    }
    else {
        if (idx0 & 0x01)
            dec_sample[i] |=(1<<(snf-1))
        idx0>>=1;
    }
}
```

While the bit-sliced data of quantized frequency components is coded from the MSB to the LSB, when the sign bits of non-zero frequency coefficients are arithmetic-coded. A negative (−) sign bit is represented by 1 and a positive (+) sign bit is represented by 0.

Therefore, if the bit-sliced data is arithmetic-decoded in a decoder and a non-zero arithmetic-decoded bit value is encountered first, the information of the sign in the bitstream, i.e., acode_sign, follows. The sign_bit is arithmetic-decoded using this information with the models listed in Table 5.9. If the sign_bit is 1, the sign information is given to the quantized data (y) formed by coupling the separated data as follows.

```
if (y != 0)
    if (sign_bit == 1)
        y = -y
```

3.2. Inverse Quantization

The inverse quantizing portion restores the decoded scale factors and quantized data into signals having the original magnitudes. The inverse quantizing procedure is described in the AAC standards.

3.3. Frequency/time Mapping

The frequency/time mapping portion inversely converts audio signals of a frequency domain into signals of a temporal domain so as to be reproduced by a user. The formula for mapping the frequency domain signal into the temporal domain signal is defined in the AAC standards. Also, various items such as a window related to mapping are also described in the AAC standards.

The aforementioned embodiment of the present invention can be formed as a program executable in a computer. The program can be stored in a recording medium such as a CD-ROM, a hard disk, a floppy disk or a memory. The recording medium is commercially available. The recording medium is evidently within the scope of the present invention.

The present invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) And carrier waves (e.g., transmissions over the Internet). Hence, the present invention may be embodied as a computer usable medium having computer readable program code means embodied therein for coding a sequence of digital dataq of a predetermined number, the computer readable program code means in the computer usable medium comprising computer readable program code means for causing a computer to effect signal-processing input audio signals and quantizing the same for each predetermined coding band, and computer readable program code means for causing a computer to effect packing the quantized data to generate bitstreams, wherein bitstream generating step comprises coding the quantized data corresponding to the base layer, coding the quantized data corresponding to the next enhancement layer of the coded base layer and the remaining quantized data uncoded due to a layer size limit and belonging to the coded layer, and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number; and then arithmetic-coded using a predetermined probability model in the order ranging from the MSB sequences to the LSB sequences, the side information containing scale factors and probability models to be used in the arithmetic coding. A functional program, code and code segments, used to implement the present invention can be derived by a skilled computer programmer from the description of the invention contained herein.

According to the present invention, while using the conventional audio algorithm such as the MPEG-2 AAC standards, only the lossless coding portion is modified to allow scalability.

Also, since the conventional audio algorithm is used, the operation necessary for implementing the present invention is simplified.

Since the bitstreams are scalable, one bitstream may contain various Bitstreams having several bitrates. If the present invention is combined with the AAC standards, almost the same audio quality can be attained at the bitrate of the top layer.

Also, since coding is performed according to significance of quantization bits, instead of performing coding after processing the difference between quantized signals of the previous layer and the original signal, for each layer, the complexity of the coding apparatus is reduced.

Since one bitstream contains multiple bitstreams, the bitstreams for various layers can be generated simply and the complexity of a transcoder is reduced.

If the bitrate is lowered, due to limited bands with, the complexity of a filter, which is a major source of the complex coding and decoding, is considerably lessened. Accordingly, the complexity of a coding and decoding apparatus is lessened.

Also, according to the performance of users' decoders and bandwidth/congestion of transmission channels or by the users' request, the bitrates or the complexity can be controlled.

To satisfy various user requests, flexible bitstreams are formed. In other words, by user request, the information for the bitrates of various layers is combined with one bitstream without overlapping, thereby providing bitstreams having good audio quality. Also, no converter is necessary between a transmitting terminal and a receiving terminal. Further, any state of transmission channels and various user requests can be accommodated.

What is claimed is:

1. A scalable audio encoding method for coding audio signals into a layered data stream having a base layer and a plurality of enhancement layers, comprising the steps of:

quantizing input audio signals for each of a plurality of predetermined coding bands; and generating bitstreams by packing the quantized data, wherein the bitstream generating step comprises:
slicing said quantized data into sliced bits;
coding sliced bits of the quantized data corresponding to the base layer;
coding sliced bits of the quantized data corresponding to the first enhancement layer; and
sequentially coding sliced bits of the quantized data corresponding to each subsequent enhancement layer to form bitstreams,
wherein each of the base layer coding step, the first enhancement layer coding step and the sequential enhancement coding steps include (i) coding both side information and quantized data corresponding to each respective layer to be represented by digits of a same predetermined number; and (ii) arithmetic-coded using a predetermined probability model,
and wherein the base layer coding step includes coding the most significant bits of the quantized data, the first enhancement layer coding step includes coding the next to most significant bits, and each subsequent enhancement coding steps includes coding progressively lower significant bits until the last enhancement layer includes coding the least significant bits.

2. The scalable audio encoding method according to claim 1, wherein the step of coding side information includes coding scale factors and probability models to be used in the arithmetic-coding.

3. The scalable audio encoding method according to claim 2, wherein the step of coding the scale factors comprises the steps of:

obtaining the maximum scale factor;
obtaining differences between the maximum scale factor and the respective scale factors; and
arithmetic-coding the differences.

4. The scalable audio encoding method according to claim 3, wherein the step of arithmetic coding the differences include using probability models listed in Tables 5.1 through 5.4.

5. The scalable audio encoding method according to claim 1, wherein the arithmetic coding step include using probability models listed in Tables 6.1 through 6.31.

6. The scalable audio encoding method according to claim 5, wherein the coding of the side information includes coding the probability models, and coding the probability models includes the steps of:
   obtaining the minimum value of the probability model information values;
   obtaining differences between the minimum probability model information and the respective model information values; and
   arithmetic-coding the differences.

7. The scalable audio encoding method according to claim 6, wherein the arithmetic coding step includes using probability models listed in Tables 5.5 through 5.9.

8. A scalable audio encoding method according to claim 1, further comprising:
   receiving quantized data composed of sign data and magnitude data;
   a. coding by a predetermined encoding method the most significant bit sequences composed of most significant bits of the magnitude data of the quantized data represented by the same number of bits;
   b. coding sign data corresponding to non-zero data among the coded most significant bit sequences;
   c. coding the most significant bit sequences among uncoded magnitude data of the quantized data by said predetermined encoding method;
   d. coding uncoded sign data among the sign data corresponding to non-zero magnitude data among bit sequences; and
   e. performing the magnitude data coding step and the sign data coding step of steps c and d on the respective bits of the quantized data until all of the quantized data is coded.

9. The scalable audio encoding method according to claim 8, wherein said predetermined encoding method includes arithmetic coding and said sign data coding steps include using a probability model having a size of 2 and cumulative frequency values of 8192 and 0.

10. The scalable audio encoding method according to claim 8, further comprising the step of coupling respective bit sequences representing the coded magnitude data and sign data into units of bits of a predetermined number.

11. The scalable audio encoding method according to claim 10, wherein said predetermined number of bits is 4.

12. The scalable audio encoding method according to claim 10, wherein a four-dimensional vector coupled in units of bits is divided into two subvectors according to the data pattern of the two subvectors in coding the respective samples.

13. The scalable audio encoding method according to claim 1, wherein the bitrate of the base layer is 16 kbps and an interlayer bitrate is 1 kbps.

14. The scalable audio encoding method according to claim 1, further comprising coding a single set of header information commonly used for said base layer, first enhancement layer and each subsequent enhancement layer.

15. The scalable audio encoding method according to claim 1, wherein the audio input signal quantization step includes the steps of:
   converting input audio signals of a temporal domain into signals of a frequency domain for each of a plurality of predetermined subbands;
   coupling together the converted signals as signals of said predetermined subbands by time/frequency mapping;
   calculating a masking threshold at each predetermined subband; and
   quantizing the signals for each predetermined subband so that quantization noise of each band is smaller than the masking threshold.

16. The scalable audio encoding method according to claim 1, wherein the bitrate of the base layer is 16 kbps and an interlayer bitrate is 8 kbps.

17. A scalable audio coding apparatus comprising:
   a quantizing portion for (i) signal-processing input audio signals and (ii) quantizing the same for each coding band; and
   a bit packing portion for (i) generating bitstreams by band-limiting a base layer into scale factor bands so as to be scalable, (ii) coding side information corresponding to the base layer, (iii) coding the quantized information sequentially from the most significant bit sequence to the least significant bit sequence and from lower frequency components to higher frequency components corresponding to the base layer, and (iv) coding side information and the quantized data corresponding to the next enhancement layer, to perform coding on all layers.

18. The scalable audio coding apparatus according to claim 17, wherein the quantizing portion comprises:
   a time/frequency mapping portion for converting the input audio signals of a temporal domain into signals of a frequency domain;
   a psychoacoustic portion for coupling the converted signals by signals of predetermined subbands by time/frequency mapping and calculating a masking threshold at each subband using a masking phenomenon generated by interaction of the respective signals; and
   a quantizing portion for quantizing the signals for each predetermined coding band while the quantization noise of each band is compared with the masking threshold.

19. A scalable audio decoding method for decoding audio data coded to have layered bitrates, comprising the steps of:
   decoding side information having at least scale factors and arithmetic-coding model information allotted to each band, said side information decoding step being repeated for each layer in the order of creation of the layers in datastreams having layered bitrates, by analyzing the significance of bits composing the datastreams, from upper significant bits to lower significant bits, using the arithmetic coding models corresponding to the quantized data;
   restoring the decoded scale factors and quantized data into signals having the original magnitudes; and
   converting inversely quantized signals into signals of a temporal domain.

20. The scalable audio decoding method according to claim 19, wherein the decoding step decodes said side information in units of four-dimensional vectors.

21. The scalable audio decoding method according to claim 20, wherein the restoring step includes restoring four-dimensional vectors from two subvectors arithmetic-decoded according to the coding states of the respective samples.

22. The scalable audio decoding method according to claim 21, further comprising the step of arithmetic-decoding using the probability models listed in Tables 6.1 through 6.31.

23. The scalable audio decoding method according to claim 19, wherein the decoding of the scale factors are performed by the steps of:

decoding the maximum scale factor in the bitstream, arithmetic-decoding differences between the maximum scale factor and the respective scale factors, and subtracting the differences from the maximum scale factor.

24. The scalable audio decoding method according to claim 23, further comprising the step of arithmetic-decoding the probability models listed in Tables 5.1 through 5.4.

25. The scalable audio decoding method according to claim 23, further comprising arithmetic-decoding using the probability models listed in Tables 5.5 through 5.8.

26. The scalable audio decoding method according to claim 19, wherein the decoding of arithmetic model indices is performed by decoding the minimum arithmetic model index in the bitstream, decoding differences between the minimum index and the respective indices in the side information of the respective layers, and adding the minimum index and the differences.

27. A computer usable medium, tangibly embodying a program of instructions executable by the machine to perform a scalable audio coding method for coding audio signals into a layered data stream having a base layer and enhancement layers of a predetermined number, the program comprising the steps of:

quantizing input audio signals for each of a plurality of predetermined coding bands; and generating bitstreams by packing the quantized data, wherein the bitstream generating step comprises:
coding the quantized data corresponding to the base layer;
coding the quantized data corresponding to the first enhancement layer of the coded base layer; and
sequentially coding sliced bits of the quantized data corresponding to each subsequent enhancement layer to form bitstreams,
wherein each of the base layer coding step, the first enhancement layer coding step and the sequential enhancement coding steps include (i) coding both side information and quantized data corresponding to each respective layer to be represented by digits of a same predetermined number; and (ii) arithmetic-coded using a predetermined probability model,
and wherein the base layer coding step includes coding the most significant bits of the quantized data, the first enhancement layer coding step includes coding the next to most significant bits, and each subsequent enhancement coding step includes coding progressively lower significant bits until the last enhancement layer includes coding the least significant bits.

28. The program storage device according to claim 27, wherein the scale factor coding step comprises the steps of:
obtaining the maximum scale factor;
obtaining differences between the maximum scale factor and the respective scale factors; and
arithmetic-coding the same.

29. The program storage device according to claim 28, wherein the coding of the side information includes coding the probability models and coding the probability models includes the steps of:
obtaining the minimum value of the probability model information values;
obtaining differences between the minimum probability model information and the respective model information values; and
arithmetic-coding the differences using the probability models listed in Tables 5.5 through 5.9.

30. A computer usable medium, tangibly embodying a program of instructions executable by the machine to perform a scalable audio decoding method for decoding audio data coded to have layered bitrates, comprising the steps of:
receiving and decoding side information having at least scale factors and arithmetic-coding model information allotted to each band, said side information decoding step being repeated for each layer in the order of creation of the layers in datastreams having layered bitrates, by analyzing the significance of bits composing the datastreams, from upper significant bits to lower significant bits, using the arithmetic coding models corresponding to the quantized data;
restoring the decoded scale factors and quantized data into signals having the original magnitudes; and
converting inversely quantized signals into signals of a temporal domain, a recording medium capable of reading a program for executing the scalable audio encoding method using a computer.

31. The program storage device according to claim 30, wherein said decoding step includes decoding side information in units of four-dimensional vectors, and decoding bit-sliced information of four samples in the four-dimensional vectors.

32. The program storage device according to claim 30, wherein the decoding of the scale factors is performed by decoding the maximum scale factor, arithmetic-coding the differences between the maximum scale factor and the respective scale factors and subtracting the differences from the maximum scale factor.

33. The program storage device according to claim 30, wherein the decoding of the arithmetic model indices is performed by decoding the minimum arithmetic model index in the bitstream, decoding differences between the minimum index and the respective indices in the side information of the respective layers, and adding the minimum index and the differences.

34. The scalable audio encoding method according to claim 11, wherein a four-dimensional vector coupled in units of bits is divided into two subvectors according to its data patterns in coding the respective samples.

35. A scalable audio encoding method for coding audio signals into a layered data stream having a base layer and enhancement layers of a predetermined number, comprising the steps of:

signal-processing input audio signals and quantizing the same for each predetermined coding band; and packing the quantized data to generate bitstreams, wherein the bitstream generating step comprises:
coding the quantized data of a first range of frequencies corresponding to the base layer;
coding the quantized data of a second range of frequencies corresponding to a first enhancement layer; and
sequentially coding sliced bits of the quantized data corresponding to each subsequent enhancement layer to form bitstreams,
wherein each of the base layer coding step, the first enhancement layer coding step and the sequential enhancement coding steps include (i) coding both side information and quantized data corresponding to each respective layer to be represented by digits of a same predetermined number; and (ii) arithmetic-coded using a predetermined probability model,
and wherein the base layer coding step includes coding the most significant bits of the quantized data, the first enhancement layer coding step includes coding the next to most significant bits, and each subsequent enhancement coding step includes coding progressively lower significant bits until the last enhancement layer includes coding the least significant bits.

36. The scalable audio coding method according to claim 35, said second range of frequencies includes frequencies different from said first range of frequencies wherein the most significant digits of the quantized data of said frequencies different from said first range of frequencies are coded before coding next significant digits of the quantized data belonging to the corresponding enhancement layer.

37. The scalable audio encoding method according to claim 36, wherein the step of coding the scale factors comprises the steps of:

obtaining the maximum scale factor; and obtaining differences between the maximum scale factor and the respective scale factors and arithmetic-coding the differences.

38. The scalable audio encoding method according to claim 37, wherein the probability models listed in Tables 5.1 through 5.4 are used in the step of arithmetic-coding the differences.

39. The scalable audio encoding method according to claim 36, wherein the probability models listed in Tables 6.1 through 6.31 are used in the arithmetic-coding step.

40. The scalable audio encoding method according to claim 39, wherein the coding of the information for the probability models is performed by the steps of:

obtaining the minimum value of the probability model information values;

obtaining differences between the minimum probability model information and the respective model information values and arithmetic-coding the differences.

41. The scalable audio encoding method according to claim 40, wherein the probability models listed in Tables 5.5 through 5.9 are used in the arithmetic-coding step.

42. The scalable audio encoding method according to claim 36, wherein, when the received quantized data is composed of sign data and magnitude data, the coding step comprises the steps of:

a. coding by a predetermined encoding method the most significant bit sequences composed of most significant bits of the magnitude data of the quantized data represented by the same number of bits;

b. coding sign data corresponding to non-zero data among the coded most significant bit sequences;

c. coding the most significant bit sequences among uncoded magnitude data of the quantized data by said predetermined encoding method;

d. coding uncoded sign data among the sign data corresponding to non-zero magnitude data among bit sequences; and e. performing the magnitude data coding step and the sign data coding step on the respective bits of the quantized data until all of the quantized data is coded.

43. The scalable audio encoding method according to claim 42, wherein said predetermined encoding method includes arithmetic coding and sign data coding steps include using a probability model having a size of 2 and cumulative frequency values of 8192 and 0.

44. The scalable audio encoding method according to claim 42, further comprising the step of coupling respective bit sequences representing the coded magnitude data and sign data, into units of bits of a predetermined number.

45. The scalable audio encoding method according to claim 44, wherein said predetermined number of bits is 4.

46. The scalable audio encoding method according to claim 44, wherein a four-dimensional vector coupled in units of bits is divided into two subvectors according to its data patterns in coding the respective samples.

47. The scalable audio encoding method according to claim 45, wherein a four-dimensional vector coupled in units of bits is divided into two subvectors according to its data patterns in coding the respective samples.

48. The scalable audio encoding method according to claim 36, wherein the bitrate of the base layer is 16 kbps and an interlayer bitrate is 8 kbps.

49. The scalable audio encoding method according to claim 36, wherein the bitrate of the base layer is 16 kbps and an interlayer bitrate is 1 kbps.

50. The scalable audio encoding method according to claim 36, further comprising coding a single set of header information commonly used for said base layer, first enhancement layer and each subsequent enhancement layer.

51. The scalable audio encoding method according to claim 36, wherein the audio input signal quantization includes the steps of:

coverting input audio signals of a temporal domain into signals of a frequency domain for each of a plurality of predetermined subbands;

coupling together the converted signals as signals of said predetermined subbands by time/frequency mapping;

calculating a masking threshold at each subband; and quantizing the signals for each predetermined subband so that quantization noise of each band is smaller than the masking threshold.

52. A scalable audio decoding apparatus comprising:

a bitstream analyzing portion for receiving and decoding side information having at least scale factors and arithmetic model information and quantized data, in the order of creation of the layers in layered bitstreams;

an inverse quantizing portion for restoring the decoded scale factors and quantized data into signals having the original magnitudes; and a frequency/time mapping portion for converting inversely quantized signals of a frequency domain into signals of a temporal domain to be output.

* * * * *

UNITED STATES PATENT AND TRADEMARK OFFICE
CERTIFICATE OF CORRECTION

PATENT NO. : 6,349,284 B1 Page 1 of 1
DATED : February 19, 2002
INVENTOR(S) : Sung-hee Park and Yeon-bae Kim It is certified that error appears in the above-identified patent and that said Letters Patent is hereby corrected as shown below:

<u>Title page,</u>
Item [73], the Assignee information should read as follows:
-- [73] Assignee: Samsung Electronics Co., Ltd. --

Signed and Sealed this

Twenty-seventh Day of May, 2003

JAMES E. ROGAN
*Director of the United States Patent and Trademark Office*